(12) United States Patent
Nishita

(10) Patent No.: US 6,543,888 B2
(45) Date of Patent: Apr. 8, 2003

(54) INK-JET IMAGE RECORDING METHOD

(75) Inventor: Nobuhiro Nishita, Kanagawa (JP)

(73) Assignee: Fuji Photo Film Co., Ltd., Minami Ashigara (JP)

(*) Notice: Subject to any disclaimer, the term of this patent is extended or adjusted under 35 U.S.C. 154(b) by 0 days.

(21) Appl. No.: 09/975,992

(22) Filed: Oct. 15, 2001

(65) Prior Publication Data

US 2002/0067402 A1 Jun. 6, 2002

(30) Foreign Application Priority Data

Oct. 16, 2000 (JP) ........................................ 2000-315231

(51) Int. Cl.⁷ ................................. B41J 2/01; B41J 2/17
(52) U.S. Cl. ......................... 347/98; 347/102; 347/100
(58) Field of Search ............................... 347/102, 100, 347/95, 96, 98, 101

(56) References Cited

U.S. PATENT DOCUMENTS

| 5,063,146 A | | 11/1991 | Inagaki et al. | |
| 5,446,136 A | | 8/1995 | Pape et al. | |
| 5,502,172 A | | 3/1996 | Pape et al. | |
| 5,644,350 A | * | 7/1997 | Ando et al. | 347/96 |
| 5,847,738 A | * | 12/1998 | Tutt et al. | 347/101 |
| 5,955,142 A | * | 9/1999 | Yoshino et al. | 428/195 |
| 6,142,618 A | * | 11/2000 | Smith et al. | 347/85 |
| 6,147,139 A | * | 11/2000 | Shaw-Klein et al. | 428/195 |
| 6,270,214 B1 | * | 8/2001 | Smith et al. | 347/101 |
| 6,283,589 B1 | * | 9/2001 | Gelbart | 347/100 |

FOREIGN PATENT DOCUMENTS

| DE | 43 43 454 A1 | 6/1995 |
| EP | 0 233 039 A2 | 8/1987 |
| EP | 1 035 172 A2 | 9/2000 |
| JP | 55-18412 | 2/1980 |
| JP | 7-237348 | 9/1995 |
| JP | 8-2090 | 1/1996 |

* cited by examiner

Primary Examiner—Anh T.N. Vo
Assistant Examiner—Manish S. Shah
(74) Attorney, Agent, or Firm—Burns, Doane, Swecker & Mathis, LLP

(57) ABSTRACT

An ink-jet image recording method including: forming an image by ejecting an ink composition for ink-jet recording having an oil-soluble dye onto an image-receiving material; applying a solution having a dispersion of fine polymer particles to the image-receiving material simultaneously with or after the forming of an image; and forming a coating film having the dispersion of fine polymer particles by heating the image-receiving material after the applying of a solution.

18 Claims, No Drawings

INK-JET IMAGE RECORDING METHOD

FIELD OF THE INVENTION

The present invention relates to an ink-jet image recording method high in quality of recorded images, excellent in ejecting stability, and moreover, excellent in keeping quality of images obtained.

BACKGROUND OF THE INVENTION

With the recent spread of computers, ink-jet printers have been widely utilized for printing paper, film, cloth and the like, not only in offices, but also in homes.

Ink-jet recording methods include a system of ejecting ink droplets by the application of pressure using piezoelectric elements, a system of generating air bubbles in ink by heat to eject ink droplets, a system using ultrasonic waves and a system of attracting ink droplets by electrostatic force to eject them. Ink-jet recording ink used in these systems includes water-based ink, oil-based ink and solid (melt type) ink.

Of the ink described above, the water-based ink is mainly used in terms of production, handling, odors and safety.

High solubility in solvents, possibility of high-density recording, good hues, excellent fastness to light, heat, air, water and chemicals, good fixing properties to image-receiving materials and difficulty to blurring, excellent keeping quality as ink, no toxicity, high purity and availability at low cost have been required fro colorants (dyes and pigments) used in such ink-jet recording ink. It is however extremely difficult to search for colorants satisfying these requirements at high level. In particular, colorants having a good magenta hue and excellent in light fastness have been eagerly desired.

As the ink-jet colorants, various dyes and pigments have already been proposed and actually used. However, no colorant satisfying all requirements has been discovered yet. In the conventional well-known dyes and pigments such as ones having color index (C.I.) numbers, the hues and fastness required for the ink-jet recording ink are difficult to be compatible with each other.

On the other hand, methods have been studied in which coating films are formed on image faces to break off the contact of the colorants with water, oxygen, ozone, $NO^2$ and the like, thereby improving the fastness.

JP-A-55-18412 (the term "JP-A" as used herein means an "unexamined published Japanese patent application") discloses a method of ejecting a latex-containing ink composition through a recording head. This method suffers from the problem of insufficient coating film effect, because the ejecting properties are deteriorated and the amount of the latex coated is decreased at low concentration portions.

SUMMARY OF THE INVENTION

It is therefore an object of the invention to provide an ink-jet recording method high in ejecting stability and having no disadvantages in respect to hues, weather resistance, water resistance and image quality.

The above-mentioned object has been attained by the following claimed inventions:

(1) An ink-jet image recording method comprising: forming an image by ejecting an ink composition for ink-jet recording comprising an oil-soluble dye onto an image-receiving material; applying a solution comprising a dispersion of fine polymer particles to the image-receiving material simultaneously with or after the forming of an image; and forming a coating film comprising the dispersion of fine polymer particles by heating the image-receiving material after the applying of a solution.

(2) An ink-jet image recording method comprising: applying a solution comprising a dispersion of fine polymer particles to an image-receiving material; ejecting an ink composition for ink-jet recording comprising an oil-soluble dye onto the image-receiving material for formation of an image, while the dispersion of fine polymer particles on the image-receiving material maintains a condition in which the ink composition for ink-jet recording is able to pass therethrough; and forming a coating film comprising the dispersion of fine polymer particles by heating the image-receiving material after the ejecting of an ink composition.

(3) The ink-jet image recording method set forth in (1) or (2) above, wherein the ink composition comprises a dye dispersion comprising an aqueous medium dispersed therein a high-boiling point organic solvent comprising an oil-soluble dye represented by formula (B-I) or (B-II) dissolved therein:

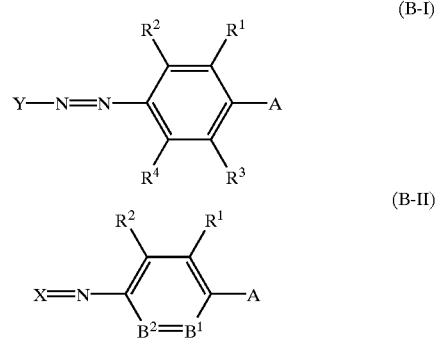

wherein $R^1$, $R^2$, $R^3$ and $R^4$ each independently represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, sulfinyl group, a phosphoryl group, an acyl group, a carboxyl group or a sulfo group; A represents —$NR^5R^6$ or a hydroxy group; $R^5$ and $R^6$ each independently represents a hydrogen atom, an aliphatic group, an aromatic group or a heterocyclic group; $R^5$ and $R^6$ may combine with each other to form a ring; $B^1$ represents=$C(R^3)$— or =N—; $B^2$ represents —$C(R^4)$= or —N=; $R^1$ and $R^5$, $R^3$ and $R^6$ and/or $R^1$ and $R^2$ may combine with each other to form an aromatic ring or a heterocyclic ring; X represents a photographic color coupler residue; and Y represents an unsaturated heterocyclic group.

(4) The ink-jet image recording method set forth in (1) to (3) above, wherein a glass transition temperature (Tg) of the polymer in the dispersion of fine polymer particles is from 40° C. to 160° C.

(5) The ink-jet image recording method set forth in (1) to (4) above, wherein a coating amount of the dispersion of fine polymer particles is from 0.1 g/m² to 10 g/m² in terms of the solid content.

(6) The ink-jet image recording method set forth in (1) to (5) above, wherein the polymer in the dispersion of fine polymer is one of a homopolymer and a copolymer both comprising more than 50% by weight of at least one monomer selected from the group consisting of styrene, alkyl acrylate, aryl acrylate, acrylamide and methacrylamide.

(7) The ink jet image recording method set forth in (1) to (6) above, wherein the polymer in the dispersion of fine polymer particles is a dissociation group-containing polymer selected from the group consisting of a vinyl polymer, polyurethane, polyester, polyamide, polyurea and polycarbonate.

(8) The ink jet image recording method set forth in (7) above, wherein the dissociation group-containing polymer is a dissociation group-containing polymer comprising a group selected from the group consisting of a cationic dissociation group and an anionic dissociation group.

(9) The ink jet image recording method according set forth in (7) or (8) above, wherein the content of dissociation groups in the dissociation group-containing polymer is from 0.1 mmol/g to 3.0 mmol/g.

(10) The ink jet image recording method set forth in (1) to (9) above, wherein the recording is conducted upon an image-receiving material, the image-receiving material comprising an ink receiving layer disposed on a support, with the ink receiving layer including a porous inorganic pigment.

DETAILED DESCRIPTION OF THE INVENTION

The invention will be described in detail below.

In the ink-jet image recording method of the invention, the oil-soluble dye-containing ink composition and the dispersion of fine polymer particles-containing solution are separately prepared, separately applied onto the image-receiving material, and heated after image formation, thereby turning the dispersion of fine polymer particles into the coating film on the image-receiving material. The weather resistance and water resistance of the image are improved by turning the dispersion of fine polymer particles into the coating film. The dispersion of fine polymer particles can be uniformly turned into the coating film on the image-receiving material, so that unevenness is not developed in a luster of the image. Further, the use of the dispersion of fine polymer particles having a high Tg can reduce stickiness on a surface of the image-receiving material after coating.

When the oil-soluble dye-containing ink composition and the dispersion of fine polymer particles-containing solution are separately applied onto the image-receiving material, the dispersion of fine polymer particles-containing solution may be uniformly given onto the image-receiving material, concurrently with or after the imagewise coating of the image-receiving material with the oil-soluble dye-containing ink composition, or the oil-soluble dye-containing ink composition may be applied imagewise after the dispersion of fine polymer particles-containing solution is uniformly applied onto the image-receiving material. The method, which the solution containing a dispersion of fine polymer particles is uniformly applied to the image-receiving material, simultaneously with or after the imagewise application of the ink composition containing an oil-soluble dye to the image-receiving material, is preferably applying the solution containing a dispersion of fine polymer particles uniformly to the image-receiving material after drying the imagewise application of the ink composition containing an oil-soluble dye to the image-receiving material. However, when the dispersion of fine polymer particles-containing solution is previously given, it is necessary to apply the oil-soluble dye-containing ink composition onto the image-receiving material, while the ink composition is in a state where the ink composition can pass through the dispersion of fine polymer particles to penetrate onto the image-receiving material.

The heating treatment for turning the dispersion of fine polymer particles into the coating film after coating may be conducted at a glass transition temperature (Tg) of the dispersion of fine polymer particles or more, and preferably at a temperature about 10° C. higher than the Tg.

There is no particular limitation on heating means, and hot air, an iron, a heated roller or infrared rays can be utilized.

Although there is no particular limitation on the time from after coating to heating, the shorter time is better. The time is preferably from 1 second to 3 minutes, and more preferably from 1 second to 1 minute.

[Oil-Soluble Dyes]

The ink composition for ink-jet recording used in the invention can be prepared by dissolving the oil-soluble composition in the high-boiling point organic solvent, and dispersing the resulting solution in the aqueous medium by emulsification. The term "aqueous medium" as used in the invention means water or a mixture of water and a small amount of a water-soluble organic solvent to which an additive such as a detergent, a stabilizer or a preservative is added as needed.

The oil-soluble dyes include yellow dyes, magenta dyes and cyan dyes, and there is no particular limitation on the solubility thereof in water.

The above-mentioned yellow dyes are not particularly limited, and can be appropriately selected from known ones. Examples thereof include aryl or heteryl azo dyes having phenols, naphthols, aniline compounds, pyrazolone compounds, pyridone compounds or open-chain active methylene compounds as coupling components; azomethine dyes having open-chain active methylene compounds as coupling components; methine dyes such as benzylidene dyes and monomethineoxonol dyes; and quinone dyes such as naphthoquinone dyes and anthraquinone dyes, and the other dye species include quinophthalone dyes, nitro-nitroso dyes, acridine dyes and acridinone dyes.

These yellow dyes may be ones which do not turn yellow until parts of chromophores dissociate. In that case, counter cations may be inorganic cations such as alkali metal ions and ammonium ions, or organic cations such as pyridinium ions and quaternary ammonium salt ions, or polymer cations having them as partial structures.

The above-mentioned magenta dyes are not particularly limited, and can be appropriately selected from known ones. Examples thereof include aryl or heteryl azo dyes having phenols, naphthols or aniline compounds as coupling components; azomethine dyes having pyrazolone compounds or pyrazolotriazole compounds as coupling components; methine dyes such as arylidene dyes, styryl dyes, merocyanine dyes and oxonol dyes; carbonium dyes such as diphenylmethane dyes, triphenylmethane dyes and xanthene dyes; quinone dyes such as naphthoquinone dyes, anthraquinone dyes and anthrapyridone dyes; and condensation polycyclic dyes such as dioxazine dyes.

These magenta dyes may be ones which do not turn magenta until parts of chromophores dissociate. In that case, counter cations may be inorganic cations such as alkali metal ions and ammonium ions, or organic cations such as pyridinium ions and quaternary ammonium salt ions, or polymer cations having them as partial structures.

The above-mentioned cyan dyes are not particularly limited, and can be appropriately selected from known ones. Examples thereof include azomethine dyes such as indoaniline dyes and indophenol dyes; polymethine dyes such as cyanine dyes, oxonol dyes and merocyanine dyes; carbonium dyes such as diphenylmethane dyes, triphenylmethane dyes and xanthene dyes; phthalocyanine dyes; anthraquinone dyes; aryl or heteryl azo dyes having phenols, naphthols or aniline compounds as coupling components; and indigo-thioindigo dyes.

These cyan dyes may be ones which do not turn cyan until parts of chromophores dissociate. In that case, counter cations may be inorganic cations such as alkali metal ions and ammonium ions, or organic cations such as pyridinium ions and quaternary ammonium salt ions, or polymer cations having them as partial structures.

Preferred examples thereof include but are not limited to C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2. Of these, particularly preferred are Nubian Black PC-0850, Oil Black HBB, Oil Yellow 129, Oil yellow 105, Oil Pink 312, Oil Red 5B, Oil Scarlet 308, Vali Fast Blue 2606, Oil Blue BOS (manufactured by Orient Kagaku Co., Ltd.), Aizen Spilon Blue GNH (manufactured by Hodogaya Chemical Co., Ltd.), and Neopen Yellow 075, Neopen Magenta SE1378, Neopen Blue 808, Neopen Blue FF4012 and Neopen Cyan FF4238 (manufactured by BASF AG).

In the invention, a disperse dye can also be used so far as it dissolves in a water-immiscible organic solvent. Preferred examples thereof include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Particularly preferred examples of the oil-soluble dyes include azo and azomethine dyes represented by the following formula (B-I) or (B-II). The dyes of general formula (B-II) are known as dyes formed from couplers and developing agents by oxidation in photographic materials.

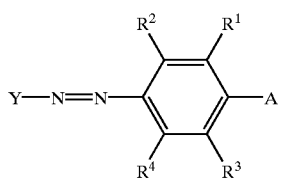

(B-I)

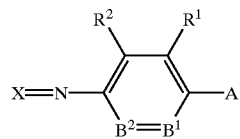

(B-II)

wherein $R^1$, $R^2$, $R^3$ and $R^4$ each independently represents a hydrogen atom, a halogen atom, an aliphatic group, an aromatic group, a heterocyclic group, a cyano group, a hydroxyl group, a nitro group, an amino group, an alkylamino group, an alkoxyl group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group, an acyl group, a carboxyl group or a sulfo group; A represents $-NR^5R^6$ or a hydroxyl group, and preferably $-NR^5R^6$, wherein $R^5$ and $R^6$, which may combine with each other to form a ring, each independently represents a hydrogen atom, an aliphatic group, an aromatic group or a heterocyclic group; $B^1$ represents $=C(R^3)-$ or $=N-$; $B^2$ represents $-C(R^4)=$ or $-N=$; preferably, $B^1$ and $B^2$ are not concurrently $-N=$, and more preferably, $B^1$ is $=C(R^3)-$ and $B^2$ is $-C(R^4)-$, $R^1$ and $R^5$, $R^3$ and $R^6$ and/or $R^1$ and $R^2$ may combine with each other to form an aromatic ring or a heterocyclic ring; X represents a residue of a color photographic coupler; and Y represents an unsaturated heterocyclic group.

$R^5$ and $R^6$ each independently represents preferably a hydrogen atom, an aliphatic group, an aromatic group or a heterocyclic group, more preferably a hydrogen atom, an alkyl or substituted alkyl group, or an aryl or substituted aryl group, and most preferably a hydrogen atom, an alkyl group having from 1 to 18 carbon atoms, or a substituted alkyl group having from 1 to 18 carbon atoms. $R^2$ is preferably a hydrogen atom, a halogen atom, an aliphatic group, an alkoxyl group, an aryloxy group, an amido group, an ureido group, a sulfamoylamino group, an alkoxycarbonylamino group or a sulfonamido group, of the above-mentioned substituent groups.

In this specification, the aliphatic group means an alkyl group, a substituted alkyl group, an alkenyl group, a substituted alkenyl group, an alkynyl group, a substituted alkynyl group, aralkyl group or a substituted aralkyl group.

The aliphatic group may be branched, or may form a ring. The aliphatic group has preferably 1 to 20 carbon atoms, and more preferably 1 to 18 carbon atoms. An aryl moiety of the aralkyl or substituted aralkyl group is preferably phenyl or naphthyl, and particularly preferably phenyl.

Examples of the substituent groups for alkyl moieties of the substituted alkyl group, the substituted alkenyl group, the substituted alkynyl group and the substituted aralkyl group include the same substituent groups as given for $R^1$, $R^2$, $R^3$ and $R^4$.

Examples of the substituent groups for an aryl moiety of the substituted aralkyl group are the same as examples of substituent groups for the following substituted aryl group.

In this specification, the aromatic group means an aryl group or a substituted aryl group. The aryl group is preferably phenyl or naphthyl, and particularly preferably phenyl.

An aryl moiety of the substituted aryl group is the same as the above-mentioned aryl group.

Examples of the substituent groups for the substituted aryl group include the same substituent groups as given for $R^1$, $R^2$, $R^3$ and $R^4$.

The unsaturated heterocyclic groups represented by Y in formula (B-1) are preferably 5- or 6-membered unsaturated heterocycles, with which aliphatic rings, aromatic rings or other heterocycles may be condensed. Examples of heteroatoms of the heterocycles include N, O and S. Examples of the saturated heterocycles include a pyrrolidine ring and a morpholine ring. Examples of the unsaturated heterocycles include a pyrazole ring, an imidazole ring, a thiazole ring, an isothiazole ring, a thiadiazole ring, a thiophene ring, a benzothiazole ring, a benzoxazole ring, a benzoisothiazole ring, a pyrimidine ring, a pyridine ring and a quinoline ring.

The heterocycles may have the substituent groups mentioned for the above $R^1$ to $R^4$.

The couplers represented by X in formula (B-II) are preferably the following couplers:

Yellow couplers: U.S. Pat. Nos. 3,933,501, 4,022,620, 4,326,024, 4,401,752 and 4,248,961, JP-B-58-10739 (the term "JP-B" as used herein means an "examined Japanese patent publication"), British Patents 1,425,020 and 1,476,760, U.S. Pat. Nos. 3,973,968, 4,314,023 and 4,511,649, EP-A-249,473, couplers represented by formulas (I) and (II) of EP-A-502,424, couplers represented by formulas (1) and (2) of EP-A-513,496 (particularly, Y-28 on page 18), couplers represented by formula (I) of claim 1 of EP-A-568,037, couplers represented by general formula (I) in lines 45 to 55 in column 1 of U.S. Pat. No. 5,066,576, couplers represented by general formula (I) in paragraph 0008 of JP-A-4-274425, couplers described in claim 1 on page 40 of EP-A-498,381 (particularly, D-35 on page 18), couplers represented by formula (Y) on page 4 of EP-A-447,969 (particularly, Y-1 on page 17 and Y-54 on page 41), and couplers represented by formulas (II) to (IV) in lines 36 to 58 in column 7 of U.S. Pat. No. 4,476,219 (particularly, II-17 and II-9 in column 17, and II-24 in column 19.

Magenta couplers: U.S. Pat. Nos. 4,310,619 and 4,351,897, European Patent 73,636, U.S. Pat. Nos. 3,061,432 and 3,725,067, Research Disclosure, No. 24220 (June, 1984), Research Disclosure, No. 24230 (June, 1984), JP-A-60-33552, JP-A-60-43659, JP-A-61-72238, JP-A-60-35730, JP-A-55-118034, JP-A-60-185951, U.S. Pat. Nos. 4,500,630, 4,540,654 and 4,556,630, WO88/04795, JP-A-3-39737 (L-57 (page 11, lower right), L-68 (page 12, lower right), L-77 (page 13, lower right)), [A-4]-63 (page 143) and [A-4]-73 and -75 (page 139) of European Patent 456,257, M-4 and -6 (page 26) and M-7 (page 27) of European Patent 486,965, M-45 (page 19) of EP-A-571,959, M-1 (page 6) of JP-A-5-204106, M-22 in paragraph 0237 of JP-A-4-362631, U.S. Pat. Nos. 3,061,432 and 3,725,067.

Cyan couplers: U.S. Pat. Nos. 4,052,212, 4,146,396, 4,228,233 and 4,296,200, European Patent 73,636, CX-1, -3, -4, -5, -11, -12, -14 and -15 (pages 14 to 16) of JP-A-4-204843, C-7 and -10 (page 35), 34 and 35 (page 37), and I-1 and I-17 (pages 42 and 43) of JP-A-4-43345, and couplers represented by general formula (Ia) or (Ib) in claim 1 of JP-A-6-67385.

In addition, couplers described in JP-A-62-215272 (page 91), JP-A-2-33144 (pages 3 and 30) and EP-A-355,660 (pages 4, 5, 45 and 47) are also useful.

Of the dyes represented by general formula (B-I), dyes represented by the following formula (B-III) are particularly preferably used as the magenta dyes.

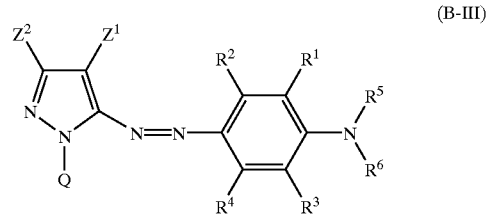

(B-III)

wherein $Z^1$ represents an electron attractive group having a Hammett's substituent constant $\sigma_p$ value of 0.20 or more. $Z^1$ is preferably an electron attractive group having a $\sigma_p$ constant of 0.30 to 1.0. Preferred specific examples of substituent groups include electron attractive substituent groups described later. Above all, preferred are an acyl group having from 2 to 12 carbon atoms, an alkyloxycarbonyl group having from 2 to 12 carbon atoms, a nitro group, a cyano group, an alkylsulfonyl group having from 1 to 12 carbon atoms, an arylsulfonyl group having from 6 to 18 carbon atoms, a carbamoyl group having from 1 to 12 carbon atoms and an alkyl halide group having from 1 to 12 carbon atoms. Particularly preferred are a cyano group, an alkylsulfonyl group having from 1 to 12 carbon atoms and an arylsulfonyl group having from 6 to 18 carbon atoms, and most preferred is a cyano group.

$R^1$ to $R^6$ have the same meaning as given for general formula (B-I). $Z^2$ represents a hydrogen atom, an aliphatic group or an aromatic group. Q represents a hydrogen atom, an aliphatic group, an aromatic group or a heterocyclic group. Above all, Q is preferably a group composed of a non-metallic atomic group necessary for forming a 5- to 8-membered ring. Of these groups, an aromatic group and a heterocyclic group are particularly preferred. The above-mentioned 5- to 8-membered ring may be substituted, may be a saturated ring, or may have an unsaturated bond. Preferred examples of the non-metallic atoms include a nitrogen atom, an oxygen atom, a sulfur atom and a carbon atom. Specific examples of such ring structures include, for example, a benzene ring, a cyclopentane ring, a cyclohexane ring, cycloheptane ring, a cyclooctane ring, a cyclohexene ring, a pyridine ring, a pyrimidine ring, a pyrazine ring, a pyridazine ring, a triazine ring, imidazole ring, a benzimidazole ring, an oxazole ring, a benzoxazole ring, an oxane ring, a sulfolane ring and a thiane ring. When these rings further have substituent groups, the substituent groups include the groups illustrated for the above-mentioned substituent groups $R^1$ to $R^4$.

A preferred dye structure represented by general formula (B-II) is described on Japanese Patent Application No. 2000-80733.

Of the dyes represented by general formula (B-II), dyes represented by the following formula (B-IV) are particularly preferably used as the magenta dyes.

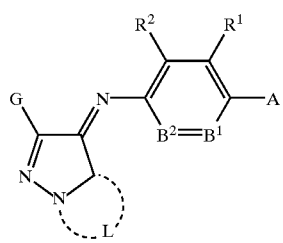

(B-IV)

wherein G represents a hydrogen atom, an aliphatic group, an aromatic group, a heterocyclic group, a cyano group, an alkoxyl group, an aryloxy group, an alkylthio group, an arylthio group, an ester group, an amino group, a carbamoyl group, a sulfonyl group, a sulfamoyl group, a ureido group, an urethane group, an acyl group, an amido group or sulfonamido group; $R^1$, $R^2$, A, $B^1$ and $B^2$ have the same meanings as given for formula (B-II), and the preferred range thereof are also the same; L represents an atomic group forming a 5- or 6-memberd nitrogen-containing heterocyclic ring which may be substituted by at least one of an aliphatic group, an aromatic group, a heterocyclic group, a cyano group, an alkoxyl group, an aryloxy group, an alkylthio group, an arylthio group, an ester group, an amino group, a carbamoyl group, a sulfonyl group, a sulfamoyl group, a ureido group, an urethane group, an acyl group, an amido group and sulfonamido group, and the heterocyclic group may further form a condensed ring with another ring.

Of the compounds represented by formula (B-IV), a compound in which L forms a 5-membered nitrogen-containing heterocyclic ring is preferred. Examples of the 5-membered nitrogen-containing heterocyclic rings include an imidazole ring, a triazole ring and tetrazole ring.

Examples of the magenta dyes represented by formulas (B-I) and (B-II) are enumerated below. However, they are for illustrating the invention in detail, and it is to be understood the invention is not limited thereto.

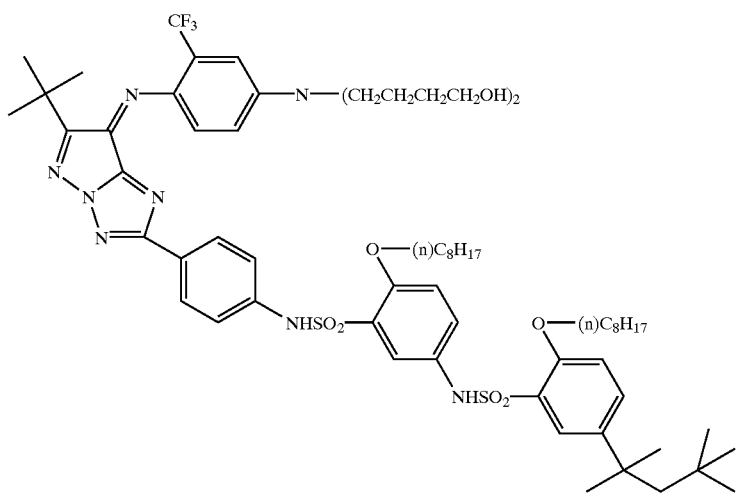

(M-1)

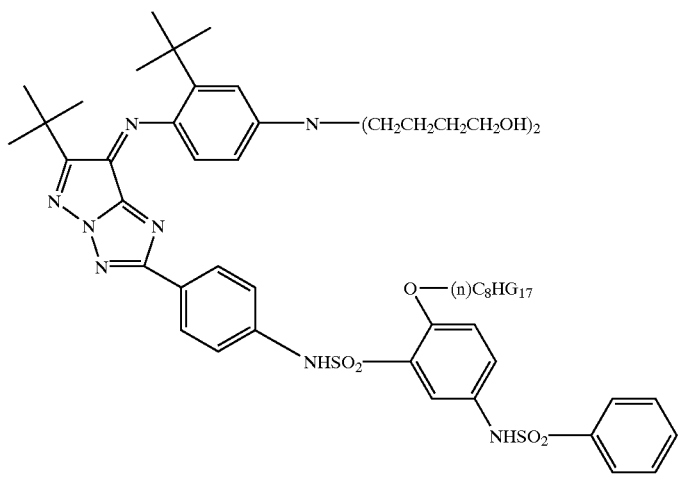

(M-2)

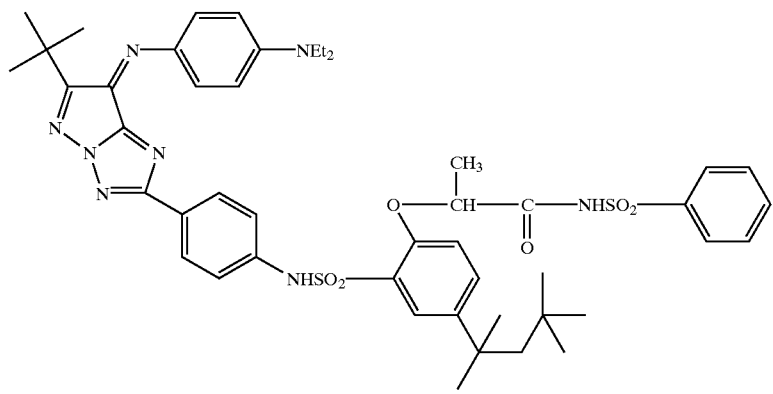
(M-3)
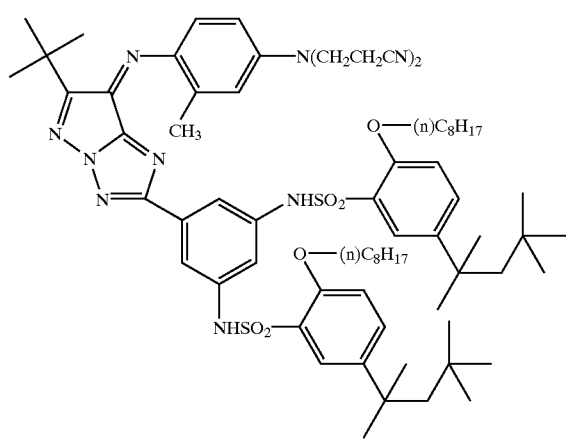
(M-4)
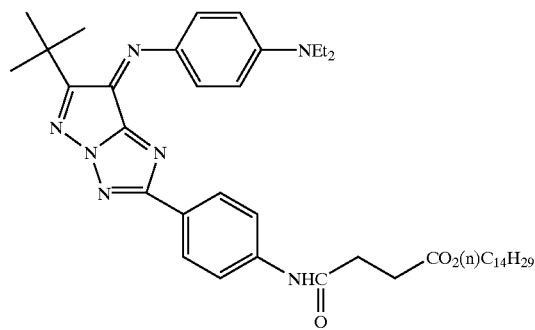
(M-5)
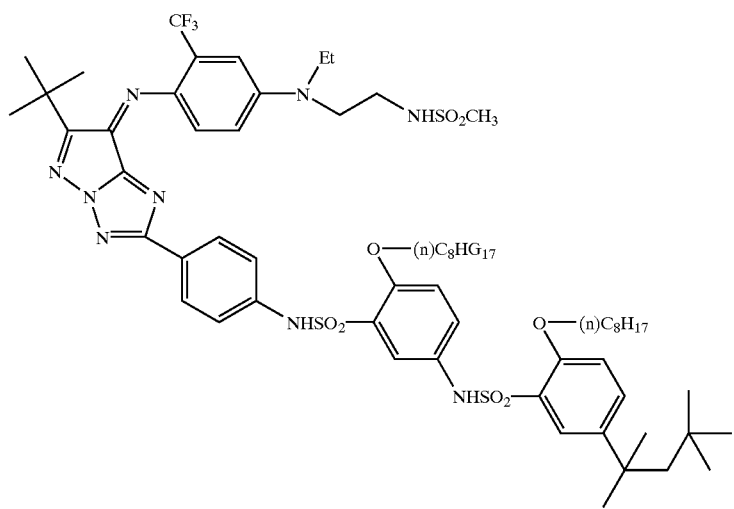
(M-6)

-continued
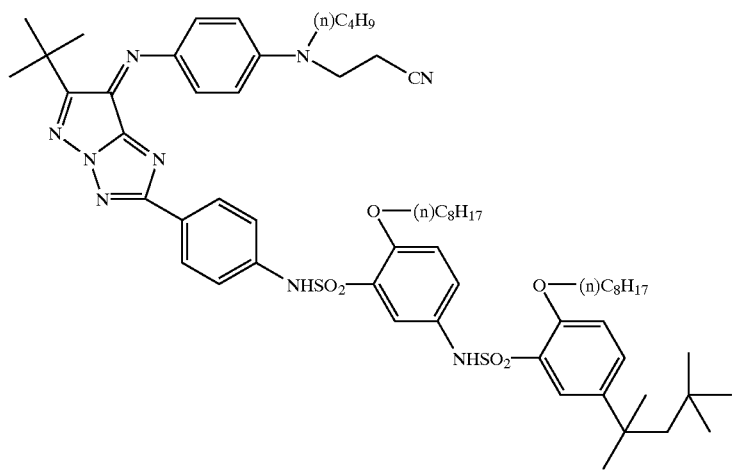
(M-7)
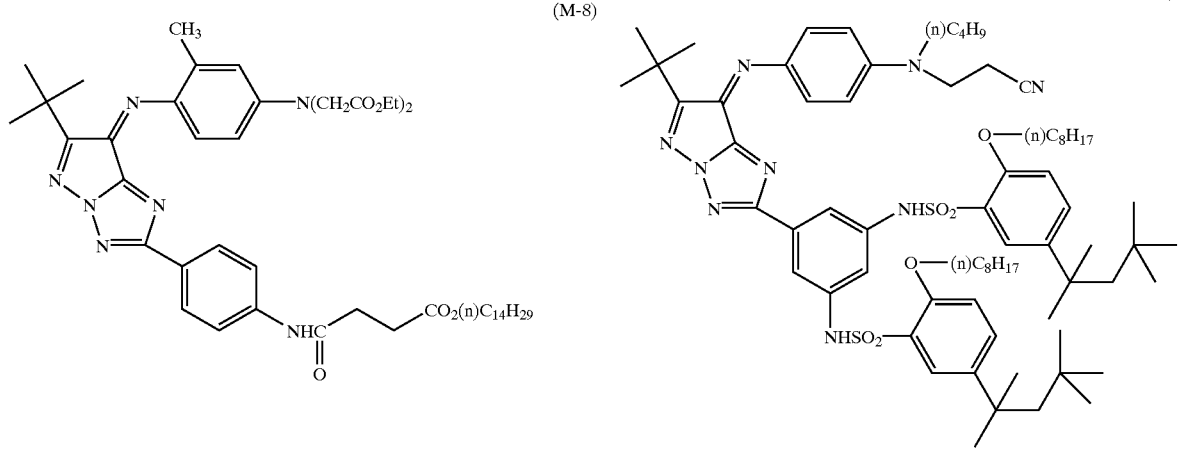
(M-8)
(M-9)
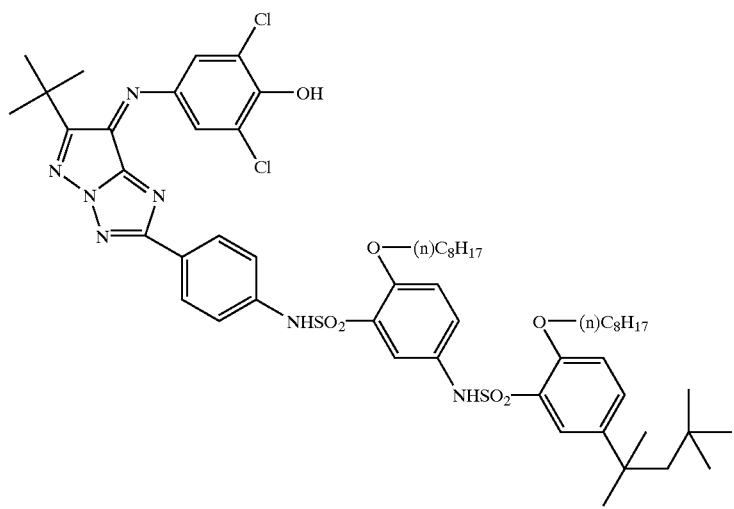
(M-10)

(M-11)
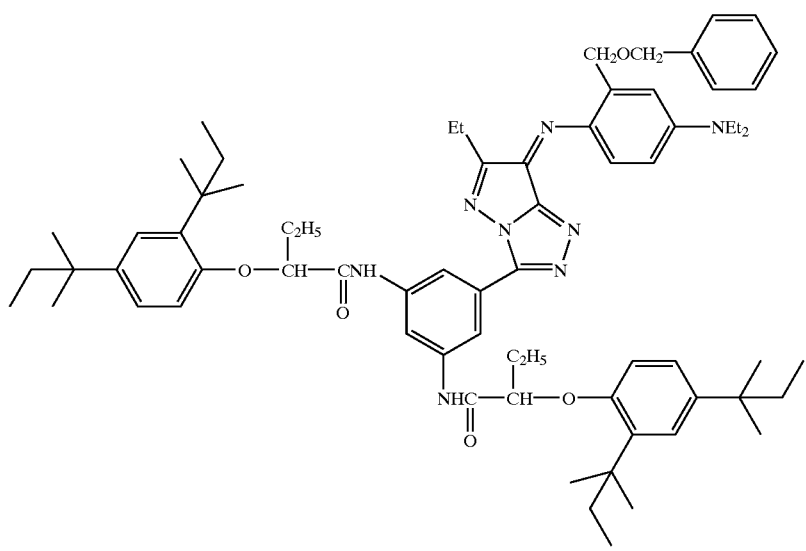
(M-12)
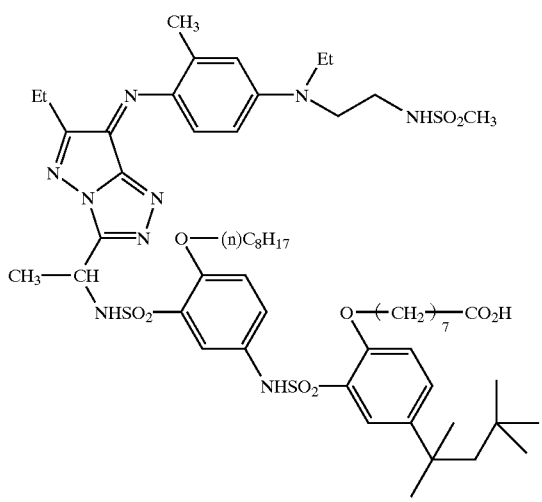
(M-13)
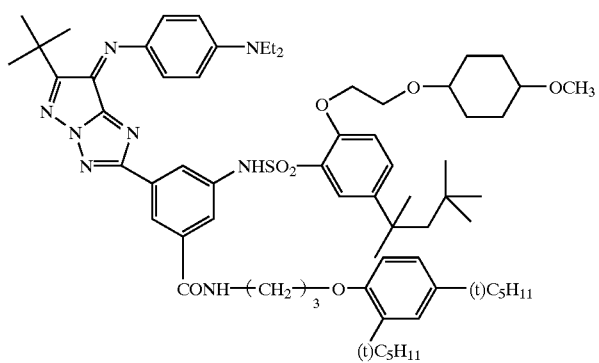
(M-14)
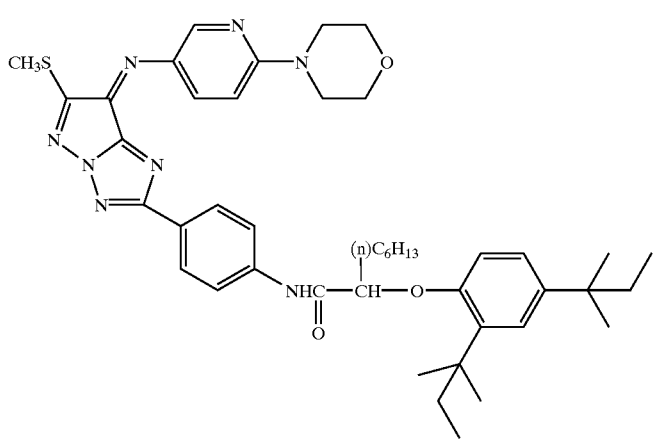

-continued
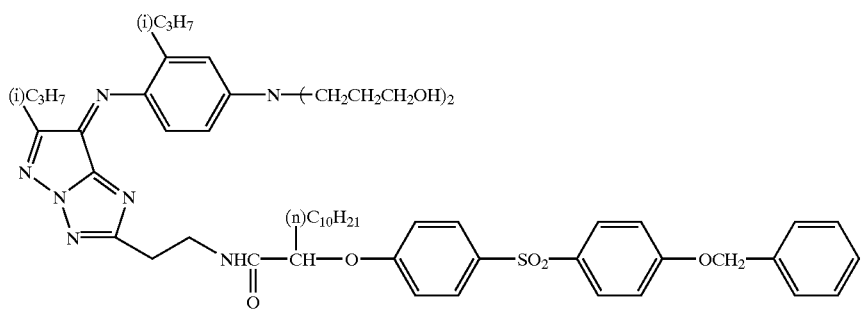
(M-15)
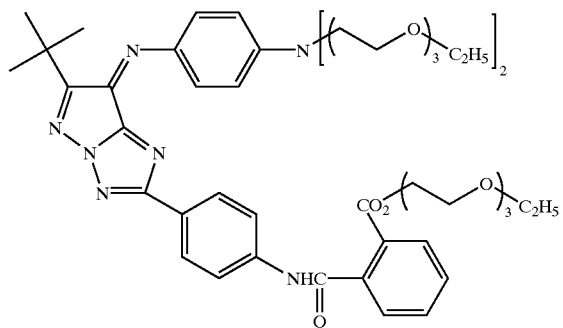
(M-16)
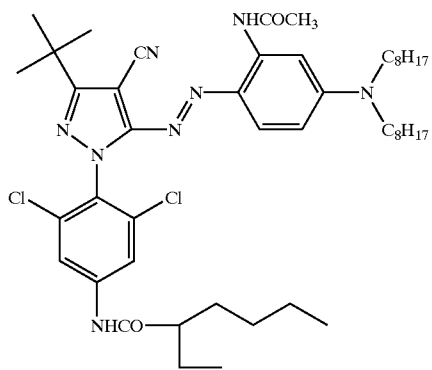
(M-17)
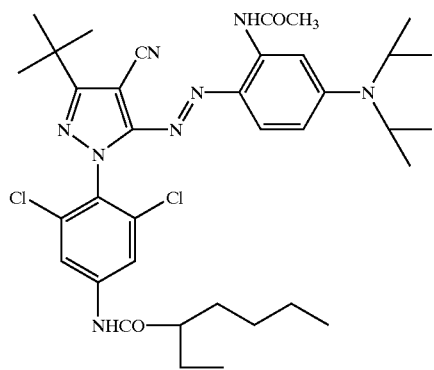
(M-18)
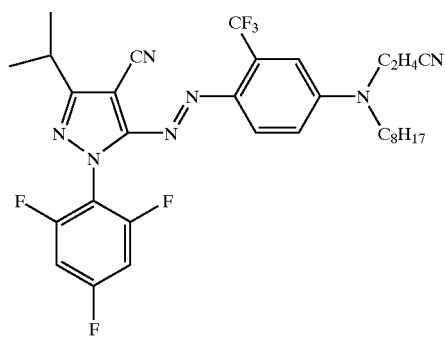
(M-19)
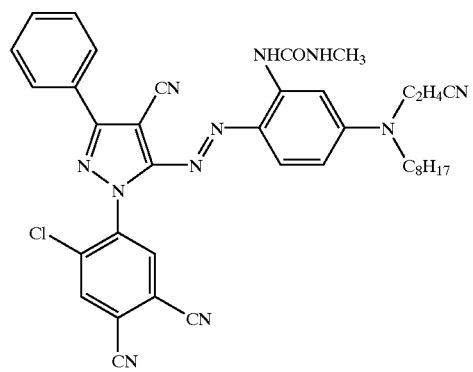
(M-20)

-continued
(M-21)
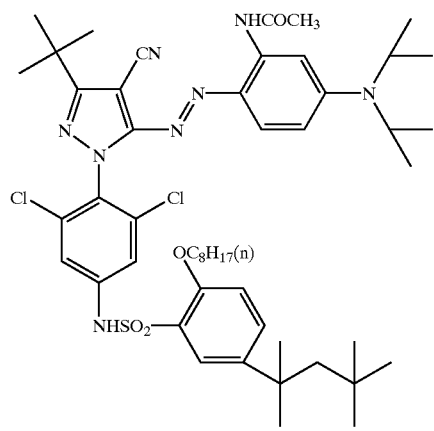
(M-22)
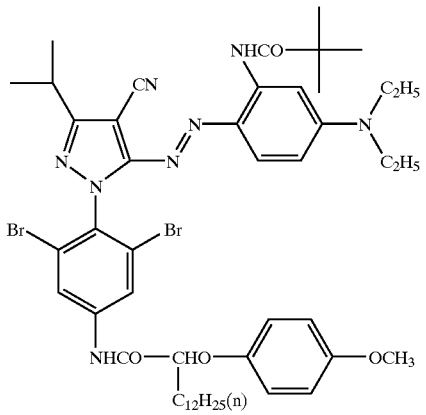
(M-23)
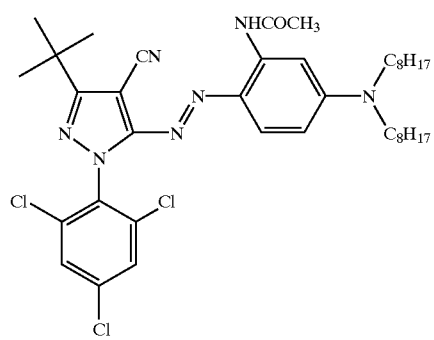
(M-24)
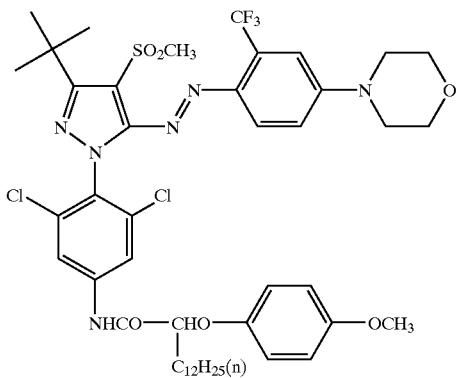
(M-25)
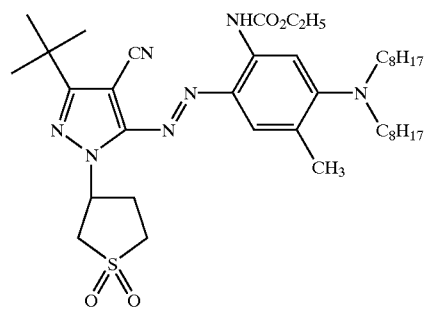
(M-26)
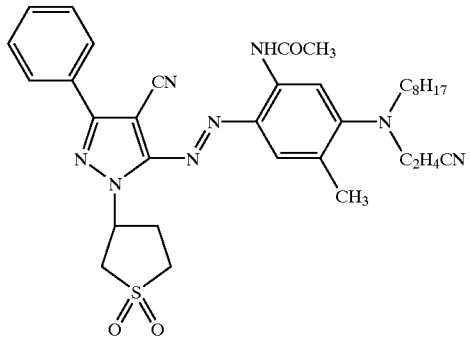
(M-27)
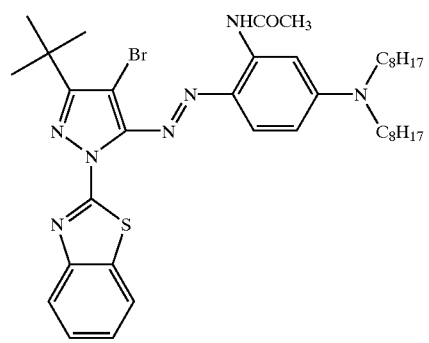
(M-28)
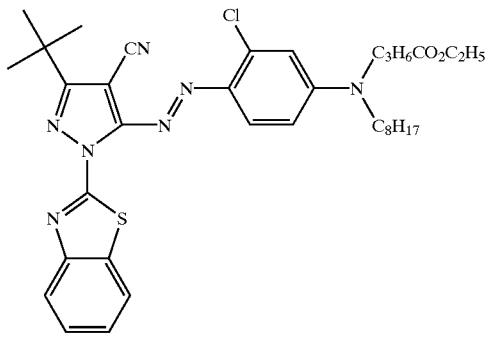

-continued
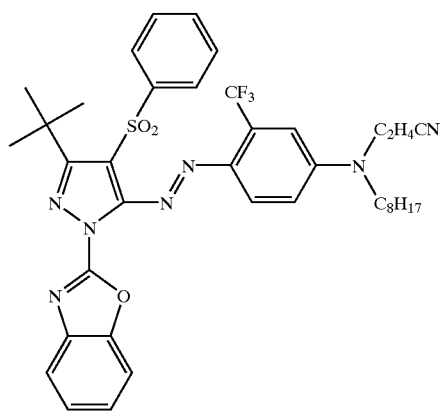
(M-29)
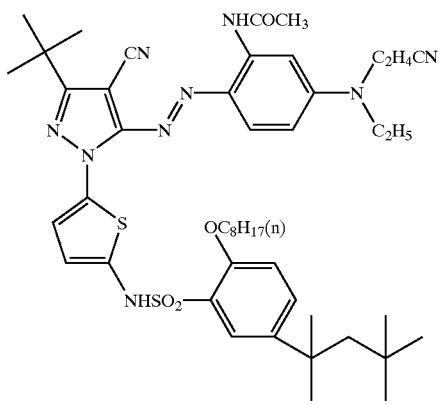
(M-30)
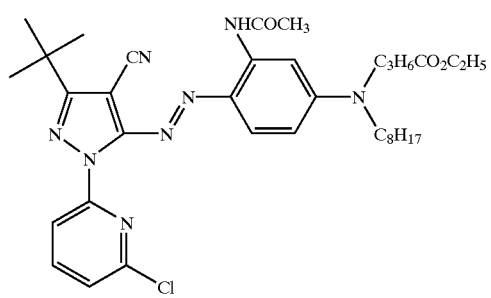
(M-31)
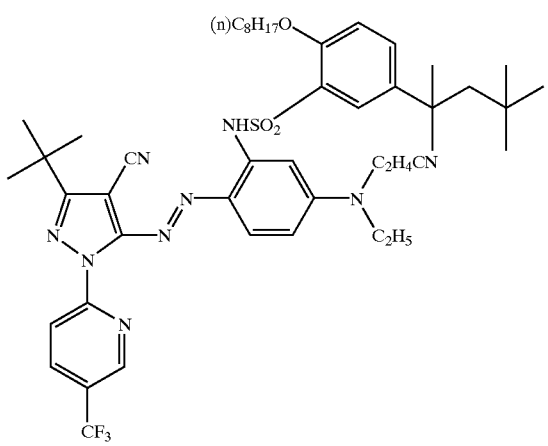
(M-32)
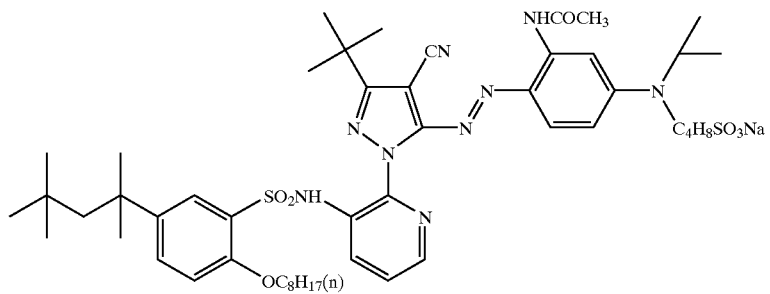
(M-33)
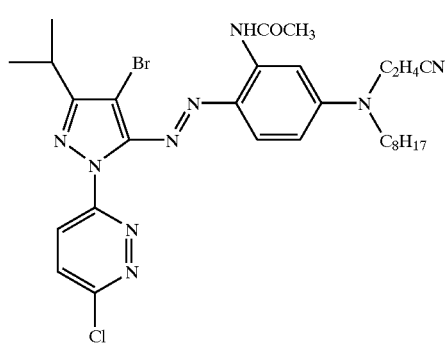
(M-34)
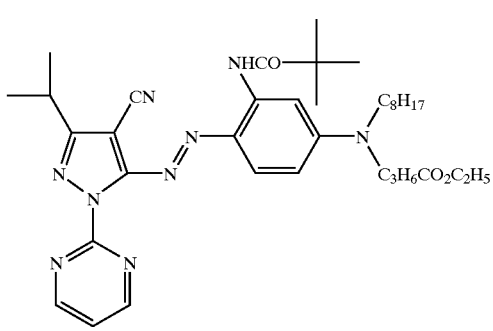
(M-35)

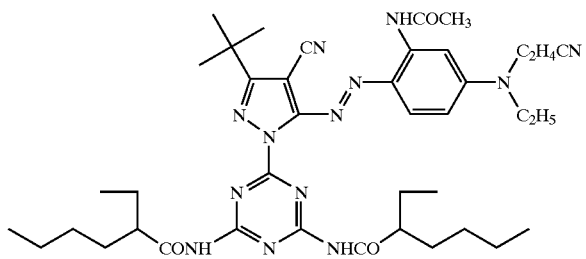

(M-36)

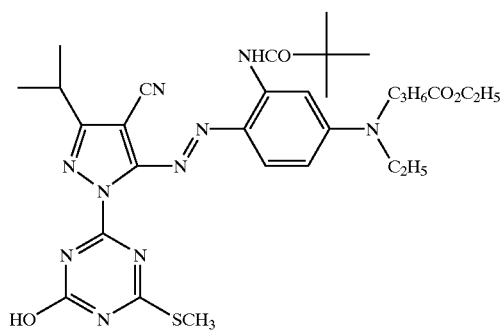

(M-37)

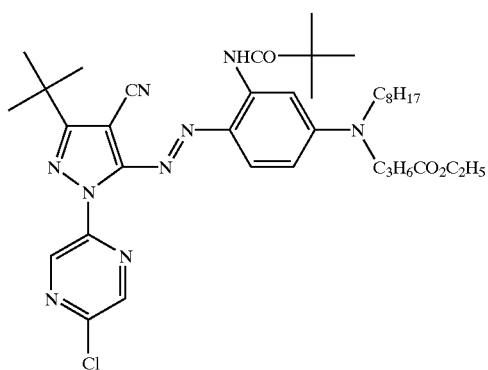

(M-38)

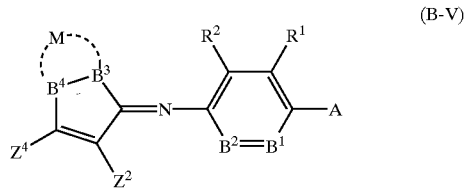

Besides, compound examples of the invention are described in Japanese Patent Application Nos. 11-365187, 11-365190 and 2000-80733, but are not limited thereto.

The dyes represented by formula (B-III) of the invention can be synthesized, for example, with reference to methods described in Japanese Patent Application No. 2000-80733 and JP-A-55-161856.

The dyes represented by formula (B-IV) of the invention can be synthesized, for example, with reference to methods described in JP-A-4-126772, JP-B-7-94180 and Japanese Patent Application No. 11-365187.

Of the dyes represented by general formula (B-II), pyrrolotriazoleazomethine dyes represented by the following formula (B-V) are particularly preferably used as the cyan dyes.

(B-V)

wherein A, $R^1$, $R^2$, $B^1$ and $B^2$ have the same meanings as given for formula (B-II), and the preferred range thereof are also the same; $B^3$ and $B^4$ each independently has the same meaning as G in formula (B-IV), and $Z^3$ and $Z^4$ may combine with each other to form a ring structure; M is an atomic group which can form a 1,2,4-triazole ring condensed with the 5-membered ring of formula (B-V); and either one of two atoms $B^3$ and $B^4$ at the condensed portion is a nitrogen atom, and the other is a carbon atom.

Further, the pyrrolotriazoleazomethine compounds represented by the above-mentioned general formula (B-V) in which $Z^3$ is an electron attractive group having a Hammett's substituent constant $\sigma_p$ value of 0.30 or more are more preferred because of their sharp absorption. Furthermore, $Z^3$ is more preferably an electron attractive group having a Hammett's substituent constant $\sigma_p$ value of 0.45 or more, and most preferably an electron attractive group having a Hammett's substituent constant $\sigma_p$ value of 0.60 or more. The compounds in which the sum of Hammett's substituent constant $\sigma_p$ values of $Z^3$ and $Z^4$ is 0.70 or more are more preferred, because they exhibit an excellent hue as magenta.

Although the pyrrolotriazoleazomethine compounds represented by general formula (B-V) of the invention are preferably used as the cyan dyes, they can also be used as the magenta dye by changing the substituent groups.

Examples of the electron attractive groups having a Hammett's substituent constant $\sigma_p$ value of 0.60 or more include a cyano group, a nitro group, an alkylsulfonyl group (e.g., methanesulfonyl) and an arylsulfonyl group (e.g., benzenesulfonyl).

Examples of the electron attractive groups having a Hammett's substituent constant $\sigma_p$ value of 0.45 or more include, in addition to the above, an acyl group (e.g., acetyl), an alkoxylcarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and an alkyl halide group (e.g., trifluoromethyl).

Examples of the electron attractive groups having a Hammett's substituent constant $\sigma_p$ value of 0.30 or more include, in addition to the above, an acyloxy group (e.g., acetoxy), a carbamoyl group (e.g., N-ethylcarbamoyl, N,N-dibuthyl-carbamoyl), an alkoxyl halide group (e.g., trifluoromethyloxy), an aryloxy halide group (e.g., pentafluorophenyloxy), a sulfonyloxy group (e.g., methylsulfonyloxy), an alkylthio halide group (e.g., difluoromethylthio), an aryl group substituted by two or more electron attractive groups having a $\sigma_p$ constant of 0.15 or more (e.g., 2,4-dinitrophenyl, pentachlorophenyl) and a heterocycle (e.g., 2-benzoxazolyl, 2-benzothiazolyl, 1-phenyl-2-benzimidazolyl).

Specific examples of the electron attractive groups having a $\sigma_p$ constant of 0.20 or more include, in addition to the above, a halogen atom.

Here, the Hammett's substituent constant $\sigma_p$ value used in this specification will be illustrated. Hammett's rule is an empirical rule proposed by L. P. Hammett in 1935 for quantitatively discussing the effect of substituent groups on the reaction or equilibrium of benzene derivatives, and today, the validity thereof has been widely accepted. In Hammett's rule, the $\sigma_p$ constant and the $\sigma_m$ constant are determined as the substituent constants. These constants can be found in many general publications, and are described in detail, for example, in "Lange's Handbook of Chemistry", 12th edition, edited by J. A. Dean, (Mc Graw-Hill, 1979) and "Kagaku no Ryoiki", extra issue, No. 122, pages 96 to 103 (Nankodo, 1979). In this specification, respective substituent groups are limited or illustrated by the Hammett's substituent constant $\sigma_p$ value. However, this does not means that the respective substituent groups are limited only to the substituent groups having the constant known in the literature found in the above-mentioned publications. Needless to say, the respective substituent groups also include substituent groups which would be contained in the range thereof when the constant is measured based on Hammett's rule, even if unknown in the literature. Further, although the compounds represented by general formulas (B-I) to (B-V) of the invention include compounds other than benzene derivatives, the $\sigma_p$ constant is used as a measure for showing the electronic effect of the substituent groups, independently of the substitution position. The a Hammett's substituent constant is described in Japanese Patent Application No. 11-365188, and the $\sigma_p$ constant used in the invention is the same as defined therein.

In the invention, the $\sigma_p$ constant is used in such a sense.

Specific examples of the cyan dyes used in the invention are enumerated below. However, they are for illustrating the invention in detail, and it is to be understood the invention is not limited thereto.

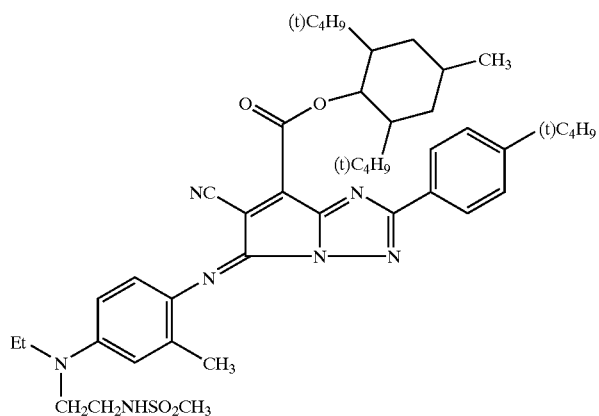

(C-1)

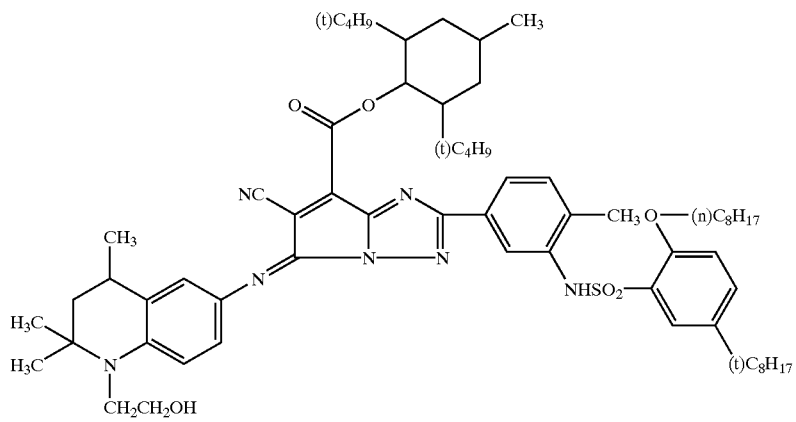

(C-2)

-continued
(C-3)
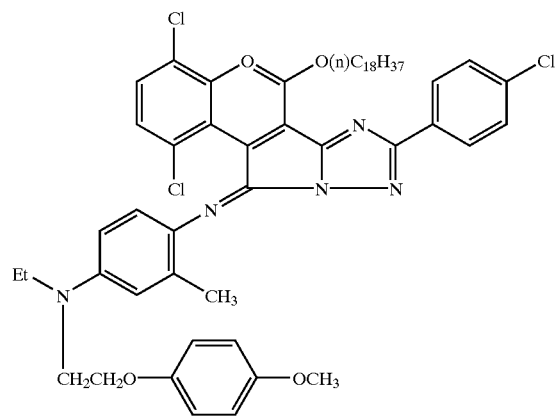
(C-4)
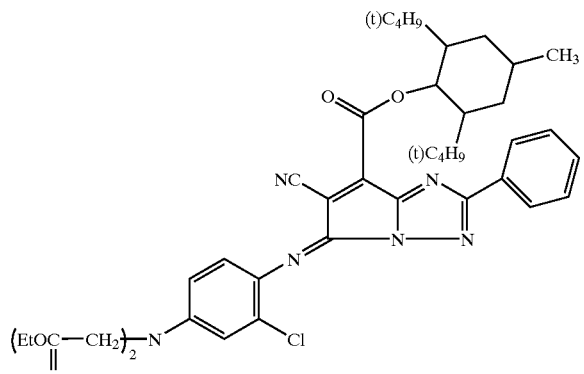
(C-5)
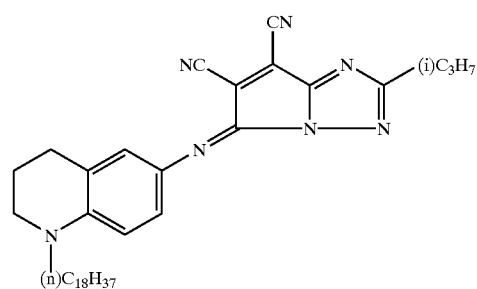
(C-6)
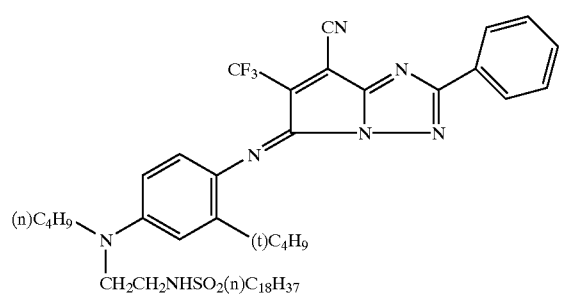
(C-7)
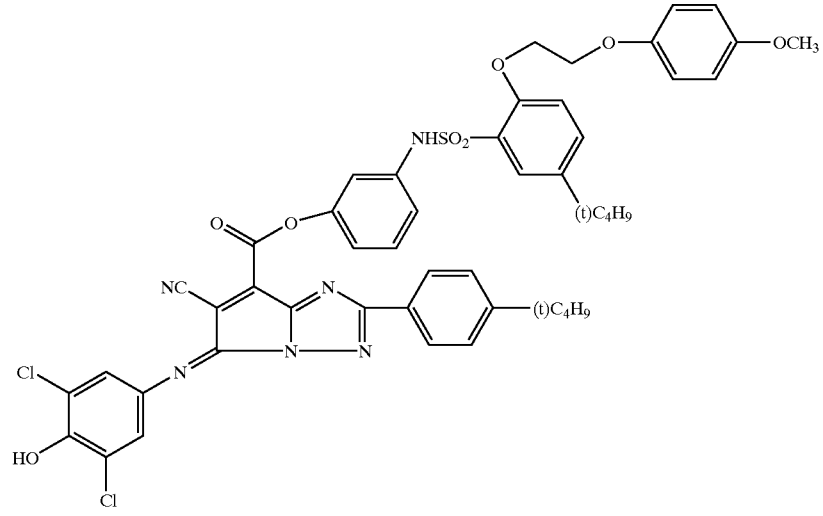
(C-8)
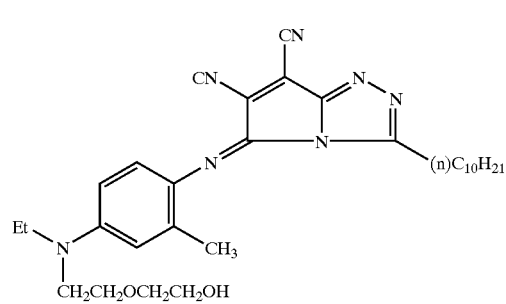
(C-9)
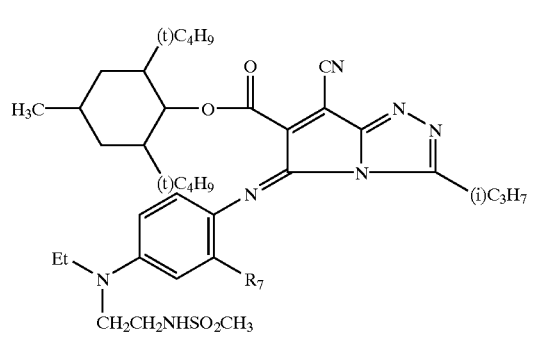

The compounds available in the invention further include but are not limited to example compounds described in Japanese Patent Application No. 11-365188.

The pyrrolotriazoleazomethine dyes represented by formula (B-V) can be synthesized with reference to methods described in JP-A-5-177959, JP-A-9-292679, JP-A-10-62926 and Japanese Patent Application No. 11-365188.

[Dispersion of Fine Polymer Particles]

The dispersion of fine polymer particles (polymer latex) used in the invention is one in which a polymer prepared by emulsion polymerization using a vinyl monomer is dispersed in an aqueous medium in the fine particle form.

The structure of the polymer constituting the dispersion of fine polymer particles may be a homopolymer of any monomer selected from the group of monomers shown below as typical examples, or a copolymer in which they are freely combined. There is no particular limitation on the available monomer unit, and any one is available, as long as it is polymerizable by usual radical polymerization.

Group of Monomers (a) Olefins: ethylene, propylene, isoprene, butadiene, vinyl chloride, vinylidene chloride, 6-hydroxy-1-hexene, cyclopentadiene, 4-pentenoic acid, methyl 8-nonenoate, vinylsulfonic acid, trimethylvinylsilane, trimethoxyvinylsilane, butadiene, pentadiene, isoprene, 1,4-divinylcyclohexane and 1,2,5-trivinylcyclohexane.

(b) $\alpha,\beta$-Unsaturated carboxylic acids and salts thereof: acrylic acid, methacrylic acid, itaconic acid, maleic acid, sodium acrylate, ammonium methacrylate and potassium itaconate.

(c) Derivatives of $\alpha,\beta$-unsaturated carboxylic acids: alkyl acrylates (e.g., methyl acrylate, ethyl acrylate, butyl acrylate, cyclohexyl acrylate, 2-ethylhexyl acrylate, dodecyl acrylate), substituted alkyl acrylates (e.g., 2-chloroethyl acrylate, benzyl acrylate, 2-cyanoethyl acrylate, allyl acrylate), alkyl methacrylates (e.g., methyl methacrylate, butyl methacrylate, 2-ethylhexyl methacrylate, dodecyl methacrylate), substituted alkyl methacrylates (e.g., 2-hydroxyethyl methacrylate, glycidyl methacrylate, glycerin monomethacrylate, 2-acetoxyethyl methacrylate, tetrahydrofurfuryl methacrylate, 2-methoxyethyl methacrylate, $\omega$-methoxypolyethylene glycol methacrylate (molar number of polyoxyethylene added: 2 to 100), polypropylene glycol monomethacrylate (molar number of polyoxypropylene added: 2 to 100), 2-carboxyethyl methacrylate, 3-sulfopropyl methacrylate, 4-oxysulfobutyl methacrylate, 3-trimethoxysilylpropyl methacrylate, allyl methacrylate), derivatives of unsaturated dicarboxylic acids (e.g., monobutyl maleate, dimethyl maleate, monomethyl itaconate, dibutyl itaconate) and multifunctional esters (e.g., ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, dipentaerythritol hexaacrylate, 1,2,4-cyclohexane trimethacrylate).

(d) Amides of $\alpha,\beta$-unsaturated carboxylic acids: for example, acrylamide, methacrylamide, N-methylacrylamide, N,N-dimethylacrylamide, N-methyl-N-hydroxyethylmethacrylamide, N-tert-butylacrylamide, N-tert-octylmethacrylamide, N-cyclohexylacrylamide, N-phenylacrylamide, N-(2-acetoacetoxyethyl)acrylamide, N-acryloylmorpholine, diacetoneacrylamide, itaconic acid diamide, N-methylmaleimide, 2-acrylamide-2-methylpropanesulfonic acid, methylenebisacrylamide and dimethacryloylpiperazine.

(e) Styrene and derivatives thereof: styrene, vinyltoluene, p-tert-butylstyrene, vinylbenzoic acid, methyl vinylbenzoate, $\alpha$-methylstyrene, p-chloromethylstyrene, vinylnaphthalene, p-hydroxymethylstyrene, sodium p-styrenesulfonate, potassium p-styrenesulfinate, 1,4-divinylbenzene and 2-acryloylethyl 4-vinylbenzoate.

(f) Vinyl ethers: methyl vinyl ether, butyl vinyl ether and methoxyethyl vinyl ether.

(g) Vinyl esters: vinyl acetate, vinyl propionate, vinyl benzoate, vinyl salicylate and vinyl chloroacetate.

(h) Other polymerizable monomers: N-vinylpyrrolidone, 2-vinyloxazoline, 2-isopropenyloxazoline and divinylsulfone.

The polymers preferably selected in the dispersion of fine polymer particles used in the invention are homopolymers or copolymers of acrylic-methacrylic resins, styrene resins, conjugated diene resins, vinyl acetate resins, polyolefin resins and the like. Of these, polymers having ethylenic unsaturated groups in main chains or side chains, that is to say, polymers having conjugated dienes or each having at least two kinds of non-conjugated ethylenic unsaturated groups and at least one monomer different in polymerization ability of each unsaturated group as a constituent monomer component, are more preferred, and polymers having conjugated dienes as constituent components are particularly preferred.

The above-mentioned preferred monomers each having at least two kinds of non-conjugated ethylenic unsaturated groups and different in polymerization ability of each unsaturated group include allyl acrylate, allyl methacrylate, N-allylacrylamide and N-allylmethacrylamide. Specific examples of the conjugated diene monomers which are particularly preferred include 1,3-butadiene, isoprene, 1,3-pentadiene, 2-ethyl-1,3-butadiene, 2-n-propyl-1,3-butadiene, 2,3-dimethyl-1,3-butadiene, 2-methyl1,3-pentadiene, 1-phenyl-1,3butadiene, 1-$\alpha$-naphthyl-1,3-butadiene, 1-$\beta$-naphthyl-1,3butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-hexadiene, cyclopentadiene and ethylidenenorbornene.

In this invention, preferably the polymer in the dispersion of fine polymer is a homopolymer or a copolymer both comprising more than about 50% by weight of at least one monomer selected from the group consisting of styrene, alkyl acrylate, aryl acrylate, acrylamide and methacrylamide.

Preferred examples of the dispersion of fine polymer particles used in the invention are enumerated below, but are not limited thereto. Unless otherwise specified, values indicating composition ratios of respective monomers are percentages by weight.

TABLE 1

| | |
|---|---|
| P-1 | Styrene/butadiene (85/15) |
| P-2 | Styrene/butadiene/acrylic acid (85/12/3) |
| P-3 | Styrene/butadiene (90/10) |
| P-4 | Ethyl acrylate/styrene/butadiene (10/85/5) |
| P-5 | Isoprene/styrene/vinyltoluene (25/50/25) |
| P-6 | Ethyl acrylate/methyl methacrylate (50/50) |
| P-7 | Ethyl acrylate/styrene/sodium 2-acrylamido-2-methyl-propanesulfonate (40/55/5) |
| P-8 | n-Butyl acrylate/styrene (25/75) |

TABLE 1-continued

| | |
|---|---|
| P-9 | n-Butyl acrylate/t-butyl acrylate/acrylic acid (17/80/3) |
| P-10 | 2-Ethylhexyl acrylate/styrene (25/75) |
| P-11 | n-Butyl methacrylate/methacrylic acid (80/20) |
| P-12 | 2-Ethylhexyl methacrylate/styrene/2-hydroxyethyl methacrylate/acrylic acid (40/40/18/2) |
| P-13 | n-Dodecyl methacrylate/methyl methacrylate/styrene/sodium styrenesulfonate (25/45/25/5) |
| P-14 | Benzyl methacrylate/methyl acrylate (80/20) |
| P-15 | Styrene/n-butyl acrylate/allyl methacrylate (60/20/20) |
| P-16 | 2-Ethylhexyl methacrylate/styrene/allyl methacrylate/methacrylic acid (30/35/30/5) |
| P-17 | t-Butylacrylamide/n-butyl acrylate/2-carboxyethyl acrylate (45/4510) |
| P-18 | Ethylene glycol dimethacrylate/ethyl methacrylate/glycidylmethacrylate/methoxypolyethyleneglycol (n = 23) monomethacrylate (5/60/20/15) |
| P-19 | Divinylbenzene/styrene/2-ethylhexyl methacrylate (5/45/50) |

These dispersion of fine polymer particles may be used alone or as a combination of two or more of them as needed.

Emulsion polymerization used for synthesizing the dispersion of fine polymer particles of the invention will be described below. Emulsion polymerization is conducted by emulsifying about 5% to about 150% by weigh of a monomer based on the dispersing medium in water or a mixed solvent of water and a water-miscible organic solvent (for example, methanol, ethanol or acetone) using 0.1% to 20% by weight of at least one emulsifier based on the monomer, and polymerizing the monomer, generally at 30° C. to about 100° C., preferably at 40° C. to 90° C., under stirring, using 0.02% to 5% by weight of a polymerization initiator based on the monomer. The amount of the water-miscible organic solvent is from 0% to 100% by volume, and preferably from 0% to 50% by volume, based on water.

As the polymerization initiators, there are azobis compounds, peroxides, hydroperoxides and redox catalysts. Examples thereof include inorganic peroxides such as potassium persulfate, ammonium persulfate, organic peroxides such as tert-butyl peroctoate, benzoyl peroxide, isopropyl percarbonate, 2,4-dichlorobenzoyl peroxide, methyl ethyl ketone peroxide, cumene hydroperoxide and dicumyl peroxide, and azo compounds such as 2,2'-azobisisobutyrate, sodium 2,2'-azobiscyanovalerate, 2,2'-azobis(2-amidinopropane) hydrochloride, 2,2'-azobis[2-(5-methyl-2-imidazoline-2-yl)propane hydrochloride and 2,2'-azobis{2-methyl-N-[1,1'-bis(hydroxymethyl)-2-hydroxyethyl]propionamide}. Of these, potassium persulfate and ammonium persulfate are particularly preferred.

As the emulsifiers, there are water-soluble polymers, as well as anionic, cationic, amphoteric and nonionic surfactants. Specific examples thereof include, for example, sodium laurate, sodium dodecyl sulfate, sodium 1-octoxycarbonylmethyl-1-octoxycarbonylmethanesulfonate, sodium laurylnaphthalenesulfonate, sodium laurylbenzenesulfonate, sodium lauryl phosphate, cetyltrimethylammonium chloride, N-2-ethylpyridinium chloride, polyoxyethylene nonyl phenyl ether, polyoxyethylene sorbitan lauryl ester, polyvinyl alcohol, emulsifiers described in JP-B-53-6190 and water-soluble polymers.

Needless to say, the polymerization initiator, the concentration, the polymerization temperature and the reaction time can be varied widely and easily in emulsion polymerization, as needed. The emulsion polymerization reaction may be conducted by previously placing the whole amounts of the monomer, the surfactant and the aqueous medium, followed by addition of the initiator, or while adding dropwise either of the monomer and the initiator solution or parts or the whole amounts of both. The fine particle dispersions of the invention can be easily synthesized by using ordinary emulsion polymerization techniques.

General emulsion polymerization processes are described in detail in "Synthetic Resin Emulsions", edited by Taira Okuda and Hiroshi Inagaki (published by Kobunshi Kankokai, 1978), "Application of Synthetic Latexes", edited by Takaaki Okuda, Yasuo Kataoka, Soichi Suzuki and Keiji Kasahara (published by Kobunshi Kankokai, 1993) and Soichi Muroi, "Chemistry of Synthetic Latexes" (published by Kobunshi Kankokai, 1970).

In particular, a latex known as a soap-free latex can be preferably used.

Other examples of the fine water-soluble polymer particle dispersions available in the invention include water-insoluble dissociative group-containing polymers. The term "water-insoluble dissociative group-containing polymer" means a polymer having an ionic dissociative group. The above-mentioned ionic dissociative groups include cationic dissociative groups such as tertiary amino groups and quaternary ammonium groups, and anionic dissociative groups such as carboxylic acids, sulfonic acids and phosphoric acids. The above-mentioned dissociative group-containing polymers include, for example, vinyl polymer and condensation polymers (e.g., polyurethanes, polyesters, polyamides, polyureas, polycarbonates). The above-mentioned water-insoluble dissociative group-containing polymer is preferably a polymer having water dispersibility, that is to say, self-emulsifiability.

The dissociative groups contained in the dissociative group-containing vinyl polymers include anionic groups such as a carboxyl group, a sulfonic acid group, a sulfuric acid monoester group, —OPO(OH)$_2$, a sulfinic acid group and a salt thereof (e.g., a salt of an alkali metal such as Na or K, or an ammonium salt such as ammonia, dimethylamine, ethanolamine, diethanolamine, triethanolamine or trimethylamine), and cationic groups such as a primary, secondary and tertiaryamines, a salt thereof (for example, a salt of an organic acid (e.g., acetic acid, propionic acid, methanesulfonic acid) and a salt of an inorganic acid (e.g., hydrochloric acid, sulfuric acid) and a quaternary ammonium salt. Above all, anionic groups are preferred and a carboxylic acid is particularly preferred.

The monomers containing the above-mentioned carboxylic acids as the dissociative groups include, for example, acrylic acid, methacrylic acid, itaconic acid, maleic acid, fumaric acid, citraconic acid, crotonic acid, a monoalkyl itaconate (e.g., monomethyl itaconate, monoethyl itaconate, monobutyl itaconate) and a monoalkyl maleate (e.g., monomethyl maleate, monoethyl maleate, monobutyl maleate).

The monomers containing the above-mentioned sulfonic acids as the dissociative groups include, for example, styrenesulfonic acid, vinylsulfonic acid, an acryloyloxyalkylsulfonic acid (e.g., acryloyloxyethylsulfonic acid, acryloyloxypropylsulfonic acid), a methacryloyloxyalkylsulfonic acid (e.g., methacryloyloxyethylsulfonic acid, methacryloyloxypropylsulfonic acid), an acrylamidoalkylsulfonic acid (e.g., 2-acrylamido-2-methylethanesulfonic acid, 2-acrylamido-2-methylpropanesulfonic acid, 2-acrylamido-2-methlybutanesulfonic acid) and a methacrylamidoalkyl-sulfonic acid (e.g., 2-methacrylamido-2-methylethanesulfonic acid, 2-methacrylamido-2-methylpropanesulfonic acid).

The monomers containing the above-mentioned phosphoric acids as the dissociative groups include, for example, monoacryloyloxyethyl phosphate and monomethacryloyloxyethyl phosphate.

Of these, preferred are acrylic acid, methacrylic acid, styrenesulfonic acid, vinylsulfonic acid, an acrylamidoalkylsulfonic acid and a methacrylamidoalkylsulfonic acid, and particularly preferred are acrylic acid, methacrylic acid, styrenesulfonic acid, 2-acrylamido-2-methylpropanesulfonic acid and 2-acrylamido-2-methylbutanesulfonic acid.

The monomers containing the above-mentioned cationic dissociative groups include, for example, monomers having tertiary amines such as a dialkylaminoethyl methacrylate and a dialkylaminoethyl acrylate, and monomers having quaternary ammonium groups such as N-2-acryloyloxyethyl-N,N,N-trimethylammonium chloride and N-vinylbenzyl-N,N,N-triethylammonium chloride.

Further, the above-mentioned dissociative group-containing monomers may be copolymerized with monomers containing no dissociative groups, and the monomers used therefor include:

Acrylates, specifically, methyl acrylate, ethyl acrylate, n-propyl acrylate, isopropyl acrylate, n-butyl acrylate, isobutyl acrylate, sec-butyl acrylate, tert-butyl acrylate, hexyl acrylate, 2-ethylhexyl acrylate, tert-octyl acrylate, 2-chloroethyl acrylate, 2-bromoethyl acrylate, 4-chlorobutyl acrylate, 2-acetoxyethyl acrylate, benzyl acrylate, cyclohexyl acrylate, furfuryl acrylate, tetrahydrofurfuryl acrylate, phenyl acrylate, 2-hydroxyethyl acrylate, 2,2-dimethyl-3-hydroxypropyl acrylate, 2-methoxy acrylate, 3-methoxybutyl acrylate, 2-ethoxyethyl acrylate, 2-butoxyethyl acrylate, 2-(2-methoxyethoxy)ethyl acrylate, glycidyl acrylate, 1-bromo-2-methoxyethyl acrylate, 2,2,2-trifluoroethyl acrylate, 1H,1H,2H,2H-perfluorodecyl acrylate, diphenyl-2-acryloyloxyethyl phosphate, diphenyl-2-methacryloyloxyethyl phosphate and dibutyl-2-acryloyloxyethyl phosphate;

Methacrylates, specifically, methylmethacrylate, ethyl methacrylate, n-propyl methacrylate, isopropyl methacrylate, n-butyl methacrylate, isobutyl methacrylate, sec-butyl methacrylate, tert-butyl methacrylate, cyclohexyl methacrylate, benzyl methacrylate, 2-ethylhexyl methacrylate, lauryl methacrylate, stearyl methacrylate, furfuryl methacrylate, tetrahydrofurfuryl methacrylate, cresyl methacrylate, naphthylmethacrylate, 2-hydroxyethylmethacrylate, 4-hydroxybutyl methacrylate, triethylene glycol monomethacrylate, dipropylene glycol monomethacrylate, 2-methoxyethyl methacrylate, 3-methoxybutyl methacrylate, 2-ethoxyethyl methacrylate, 2-butoxyethyl methacrylate, 2-(2-methoxyethoxy)ethyl methacrylate, 2-(2-ethoxyethoxy)-ethyl methacrylate, 2-acetoxyethyl methacrylate, 2-acetoacetoxyethyl methacrylate, glycidyl methacrylate, 2,2,2-trifluoroethyl methacrylate, 1H,1H,2H,2H-perfluorodecyl methacrylate and octyl-2-methacryloyloxyethyl phosphate;

Vinyl esters, specifically, vinyl acetate, vinyl propionate, vinyl butyrate, vinyl caproate, vinyl chloroacetate, vinyl methoxyacetate, vinylphenyl acetate, vinyl benzoate and vinyl salicylate;

Acrylamides, specifically, acrylamide, methyl acrylamide, ethyl acrylamide, isopropyl acrylamide, n-butyl acrylamide, tert-butyl acrylamide, tert-octyl acrylamide, cyclohexyl acrylamide, benzyl acrylamide, hydroxymethyl acrylamide, methoxymethyl acrylamide, butoxymethyl acrylamide, methoxyethyl acrylamide, phenyl acrylamide, dimethyl acrylamide, diethyl acrylamide, β-cyanoethyl acrylamide, N-(2-acetoacetoxyethyl) acrylamide and diacetone acrylamide;

Methacrylamides, specifically, methacrylamide, methyl methacrylamide, ethyl methacrylamide, propyl methacrylamide, n-butyl methacrylamide, tert-butyl methacrylamide, cyclohexyl methacrylamide, benzyl methacrylamide, hydroxymethyl methacrylamide, methoxyethyl methacrylamide, phenyl methacrylamide, β-cyanoethyl methacrylamide and N-(2-acetoacetoxyethyl) methacrylamide;

Olefins, specifically, dicyclopentadiene, ethylene, propylene, 1-butene, 1-pentene, vinyl chloride, vinylidene chloride, isoprene, chloroprene, butadiene, 2,3-dimethyl-butadiene, styrene and a derivative thereof (e.g., methylstyrene, dimethylstyrene, trimethylstyrene, ethylstyrene, chloromethylstyrene, methoxystyrene, acetoxystyrene, chlorostyrene, dichlorostyrene, bromostyrene, methyl vinylbenzoate);

Vinyl ethers, specifically, methyl vinyl ether, butyl vinyl ether, hexyl vinyl ether and methoxyethyl vinyl ether; and Other monomers such as butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyloxazolidone, N-vinylpyrrolidone, vinylidene chloride, methylenemalononitrile and vinylidene.

Nonionic dispersible group-containing monomers as shown below are also preferably copolymerized, and examples of such monomers include an ester of a polyethylene glycol monoalkyl ether and a carboxylic acid monomer, an ester of a polyethylene glycol monoalkyl ether and a sulfonic acid monomer, an ester of a polyethylene glycol monoalkyl ether and a phosphoric acid monomer, a vinyl group-containing urethane formed by a polyethylene glycol monoalkyl ether and a isocyanate group-containing monomer, and a macromonomer containing the polyvinyl alcohol structure.

The repeating number of ethyleneoxy moieties of the above-mentioned polyethylene glycol monoalkyl ether is preferably from 8 to 50, and more preferably from 10 to 30. The number of carbon atoms of an alkyl group of the above-mentioned polyethylene glycol monoalkyl ether is preferably from 1 to 20, and more preferably from 1 to 12.

The above-mentioned dissociative group-containing condensation polymers will be described in detail below.

The above-mentioned dissociative group-containing polyurethanes are basically synthesized by polyaddition using diol compounds and diisocyanate compounds as starting materials.

Specific examples of the diol compounds include ethylene glycol, 1,2-propanediol, 1,3-propanediol, 1,3-butanediol, 2,3-butanediol, 2,2-dimethyl-1,3-propanediol, 1,4-pentanediol, 2,4-pentanediol, 3,3-dimethyl-1,2-butanediol, 2-ethyl-2-methyl-1,3-propanediol, 1,6-hexanediol, 2,5-hexanediol, 2-methyl-2,4-pentanediol, 2,2-diethyl-1,3-propanediol, 2,4-dimethyl-2,4-pentanediol, 2-methyl-2-propyl-1,3-propanediol, 2,5-dimethyl-2,5-hexanediol, 2-ethyl-1,3-hexanediol, 1,2-octanediol, 2,2,4-trimethyl-1,3-pentanediol, 1,4-cyclohexanedimethanol, diethylene glycol, triethylene glycol, dipropylene glycol, tripropylene glycol, polyethylene glycol (average molecular weight: 200 to 4000), polypropylene glycol (average molecular weight: 200 to 1000), polyesterpolyol, 4,4'-dihydroxydiphenyl-2,2-propane and 4,4'-dihydroxyphenylsulfone.

Preferred examples of the diisocyanates include ethylene diisocyanate, isophorone diisocyanate, hexamethylene diisocyanate, 1,4-cyclohexane diisocyanate, 2,4-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, dicyclohexylmethane diisocyanate and methylenebis(4-cyclohexyl diisocyanate).

The dissociative group-containing polyurethanes are obtained, for example, by using dissociative group-containing diols in synthesizing the polyurethanes. In that case, the dissociative groups are introduced into the polyurethanes as substituent groups bonded to main chains of the polymers. The diols having the dissociative groups, particularly the anionic groups include but are not limited to 2,2-bis(hydroxymethyl)propionic acid, 2,2-bis(hydroxymethyl)butanoic acid, 2,5,6-trimethoxy-3,4-dihydroxyhexanoic acid, 2,3-dihydroxy-4,5-dimethoxypentanoic acid, 3,5-di-(2-hydroxy)ethyloxycarbonylbenzenesulfonic acid and a salt thereof.

The dissociative groups contained in the dissociative group-containing polyurethanes include anionic groups such as a carboxyl group, a sulfonic acid group, a sulfuric acid monoester group, —OPO(OH)$_2$, a sulfinic acid group and a salt thereof (e.g., a salt of an alkali metal such as Na or K, or an ammonium salt such as ammonia, dimethylamine, ethanolamine, diethanolamine, triethanolamine or trimethylamine), and cationic groups such as a primary, secondary, tertiary and quaternary amines and a quaternary ammonium salt. Above all, anionic groups are preferred and a carboxylic acid is particularly preferred.

The above-mentioned polyesters are basically synthesized by the condensation reaction of diol compounds with dicarboxylic acid compounds.

Specific examples of the dicarboxylic acid compounds include oxalic acid, malonic acid, succinic acid, glutaric acid, dimethylmalonic acid, adipic acid, pimelic acid, α,α-dimethylsuccinic acid, acetonedicarboxylic acid, sebacic acid, 1,9-nonanedicarboxylic acid, fumaric acid, maleic acid, itaconic acid, citraconic acid, phthalic acid, isophthalic acid, terephthalic acid, 2-butylterephthalic acid, tetrachloroterephthalic acid, acetylenedicarboxylic acid, poly(ethylene terephthalate)dicarboxylic acid, 1,2-cyclohexanedicarboxylic acid, 1,4-cyclohexanedicarboxylic acid, ω-poly-(ethylene oxide) dicarboxylic acid and p-xylylenedicarboxylic acid.

These compounds may be used in the form of alkyl esters (for example, dimethyl esters) of dicarboxylic acids or acid chlorides of dicarboxylic acids, or in the form of acid anhydrides such as maleic anhydride, succinic anhydride and phthalic anhydride, in conducting the polycondensation reaction with the diol compounds.

The dissociative group-containing polyesters are obtained by synthesis using dicarboxylic acids having dissociative groups such as anionic groups such as a sulfonic acid group, a sulfuric acid monoester group, —OPO(OH)$_2$, a sulfinic acid group and a salt thereof (e.g., a salt of an alkali metal such as Na or K, or an ammonium salt such as ammonia, dimethylamine, ethanolamine, diethanolamine, triethanolamine or trimethylamine), in addition to a carboxylic acid, and cationic groups such as a tertiary amine, a salt thereof (for example, a salt of an organic acid (e.g., acetic acid, propionic acid, methanesulfonic acid) and a salt of an inorganic acid (e.g., hydrochloric acid, sulfuric acid) and a quaternary ammonium salt. As the dissociative groups other than a carboxylic acid contained in the dissociative group-containing polyesters, anionic groups are preferred and a sulfonic acid group is particularly preferred.

Preferred examples of the above-mentioned sulfonic acid group-containing dicarboxylic acids include a sulfophthalic acid (e.g., 3-sulfophthalic acid, 4-sulfophthalic acid, 4-sulfosophthalic acid, 5-sulfosophthalic acid, 2-sulfosophthalic acid), sulfosuccinic acid, a sulfonaphthalenedicarboxylic acid (e.g., 4-sulfo-1,8-naphthalenedicarboxylic acid, 7-sulfo-1,5-naphthalenedicarboxylic acid), 3,5-di-(2-hydroxy)ethyloxycarbonylbenzenesulfonic acid and a salt thereof.

As the diol compounds, there can be used compounds selected from the same group as with the diols described for the above-mentioned urethanes.

Although a typical method for synthesizing the above-mentioned polyesters is the condensation reaction of the above-mentioned diol compounds with the dicarboxylic acids or derivatives thereof, the polyesters can also be obtained by condensing hydroxycarboxylic acids (for example, 12-hydroxy-stearic acid). The polyesters obtained by ring-opening polymerization of cyclic ethers and lactones (described in Takeo Saegusa, Course, The Theory of Polymerization Reaction, Ring-opening Polymerization (I) (Kagaku Dojin, 1971) in detail) can be suitably used in the invention.

The above-mentioned polyamides can be obtained by polycondensation of diamine compounds and dicarobxylic acid compounds, polycondensation of aminocarboxylic acid compounds of ring-opening polymerization of lactams.

The diamine compounds include ethylenediamine, 1,3-propanediamine, 1,2-propanediamine, hexamethylenediamine, octamethylenediamine, o-phenylenediamine, m-phenylenediamine, p-phenylenediamine, piperazine, 2,5-dimethyl-piperazine, 4,4'-diaminodiphenyl ether, 3,3'-diaminodiphenyl sulfone and xylylenediamine. The aminocarboxylic acids include glycine, alanine, phenylalanine, ω-aminohexanoic acid, ω-aminodecanoic acid, ω-aminoundecanoic acid and anthranilic acid. The monomers which can be used in ring-opening polymerization include ε-caprolactam, azetidinone and pyrrolidone.

As the dicarboxylic acid compounds, there can be used compounds selected from the same group as with the dicarboxylic acids described for the above-mentioned polyesters.

The above-mentioned polyureas can be basically obtained by polyaddition of diamine compounds and isocyanate compounds or deammoniation of diamine compounds and urea. As the diamine compounds and diisocyanate compounds which are raw materials, there can be used compounds selected from the same group as with the diamines described for the above-mentioned polyamides, and compounds selected from the same group as with the diisocyanates described for the above-mentioned polyurethanes, respectively.

The above-mentioned polycarbonates can be basically obtained by the reaction of diol compounds with phosgene or carbonate derivatives (for example, an aromatic ester such as diphenyl carbonate), and as the diol compounds which are raw materials, there can be used compounds selected from the same group as with the diols described for the above-mentioned polyurethanes.

The above-mentioned dissociative groups can be introduced into the above-mentioned respective polymers by various methods. For example, in the case of the polyurethanes, the dissociative groups can be introduced as substituent groups from main chains of the polymers by using the dissociative group-containing diols in synthesis, as described above. As the case where the polyesters are used as the oil-soluble polymers, the dissociative groups can also be introduced by allowing unreacted ends of the dicarboxylic acids to remain at ends of the polymers. Further, compounds which can introduce the dissociative groups by the reaction of acid anhydrides (for example, maleic anhydride) can also be reacted with reactive groups such as hydroxyl and amino groups after polymerization of the above-mentioned respective polymers, thereby introducing the dissociative groups.

In the above-mentioned dissociative group-containing polymers, one kind of necessary constituent raw material may be used for each of the vinyl polymers and the condensation polymers, or two or more kinds of raw materials can be used for each at any rate, according to various purposes (for example, the adjustment of the glass transition temperature of the polymers, the solubility, the compatibility with dyes and the stability of dispersions).

Of the above-mentioned dissociative group-containing polymers, one having at least one of a carboxyl group and a sulfonic acid group as the dissociative group is preferred, and one having a carboxyl group as the dissociative group is particularly preferred.

The content of the dissociative groups in the above-mentioned dissociative group-containing polymers is preferably from 0.1 mmol/g to 3.0 mmol/g, and more preferably from 0.2 mmol/g to 2.0 mmol/g. Too high or too low the content of the dissociative groups results in decreased self-emulsifiability of the dissociative group-containing polymers, which tends to decrease the stabilization effect of fine particle dispersions of dyes.

As to the above-mentioned dissociative groups, the anionic dissociative group may be further a salt of an alkali metals (e.g., Na, K) or an ammonium ion, and the tertiary amine of the cationic dissociative group may be further a salt of an organic acid (e.g., acetic acid, propionic acid, methanesulfonic acid) or an inorganic acid (e.g., hydrochloric acid, sulfuric acid).

In the above-mentioned dissociative groups, when excellent dispersion stability and easiness of dissociative group introduction are taken into consideration, more preferred are vinyl polymers, polyurethanes and polyesters, and particularly preferred are vinyl polymers.

Specific examples of the above-mentioned dissociative group-containing vinyl polymers are enumerated below. The ratios in parentheses mean ratios by weight. However, the invention is not limited to these specific examples at all.

TABLE 2

| PP-1 | tert-Butylmethacrylamide-methyl methacrylate-acrylic acid copolymer (60:30:10) |
|---|---|
| PP-2 | Methyl methacrylate-isobutyl methacrylate-acrylic acid copolymer (60:30:10) |
| PP-3 | Isobutyl methacrylate-tetrahydrofurfuryl acrylate-acrylic acid copolymer (60:30:10) |
| PP-4 | Methyl methacrylate-n-butyl acrylate-acrylic acid copolymer (65:25:10) |
| PP-5 | 3-Methoxybutyl methacrylate-styrene-acrylic acid copolymer (35:50:15) |
| PP-6 | Cyclohexyl methacrylate-allyl methacrylate-acrylic acid copolymer (70:20:10) |

TABLE 2-continued

| PP-7 | Isopropyl methacrylate-2-butoxyethyl methacrylate-acrylic acid copolymer (80:15:5) |
|---|---|
| PP-8 | Ethyl acrylate-phenyl methacrylate-acrylic acid copolymer (30:67:3) |
| PP-9 | Methyl methacrylate-2-ethylhexyl acrylate-acrylic acid copolymer (60:30:10) |
| PP-10 | Isobutyl methacrylate-methacrylate of polyethylene glycol monomethyl ether (the repeating number of ethyleneoxy chains: 23)-acrylic acid copolymer (70:25:5) |
| PP-11 | Isobutyl methacrylate-dipropylene glycol monomethacrylate-acrylic acid copolymer (85:10:5) |
| PP-12 | Isobutyl methacrylate-methacrylate of polyethylene glycol monomethyl ether (the repeating number of ethyleneoxy chains: 9)-acrylic acid copolymer (85:10:5) |
| PP-13 | Isobutyl acrylate-methoxystyrene-acrylic acid copolymer (30:60:10) |
| PP-14 | tert-Butyl acrylate-methacrylic acid (88:12) |
| PP-15 | Hexyl acrylate-styrene-methacrylic acid copolymer (20:70:10) |
| PP-16 | 2,2,2-trifluoroethyl methacrylate-methyl methacrylate-methacrylic acid copolymer (35:60:5) |
| PP-17 | Ethyl methacrylate-methacrylic acid copolymer (95:5) |
| PP-18 | Ethyl methacrylate-2-methoxyethyl methacrylate-methacrylic acid copolymer (70:15:15) |
| PP-19 | Vinyl acetate-methacrylic acid copolymer (85:15) |
| PP-20 | n-Butyl methacrylate-acrylamide-methacrylic acid copolymer (35:60:5) |
| PP-21 | Tert-Octylacrylamide-propyl-methacrylate-methacrylic acid copolymer (10:75:15) |
| PP-22 | n-Butyl methacrylate-diphenyl-2-methacryloyloxy-ethyl phosphate-methacrylic acid copolymer (50:40:10) |
| PP-23 | Isobutyl methacrylate-dimethylacrylamide-methacrylic acid copolymer (80:15:5) |
| PP-24 | Isobutyl methacrylate-2-(2-methoxyethoxy) ethyl methacrylate-methacrylic acid copolymer (50:35:15) |
| PP-25 | Ethyl methacrylate-2-carboxyethyl methacrylate copolymer (90:10) |
| PP-26 | Ethyl methacrylate-styrenesulfonic acid copolymer (90:10) |
| PP-27 | n-Butyl acrylate-styrene-styrenesulfonic acid copolymer (35:60:5) |
| PP-28 | n-Butyl methacrylate-2-acrylamido-2-methylethanesulfonic acid copolymer (90:10) |
| PP-29 | Ethyl methacrylate-2-acrylamido-2-methylpropanesulfonic acid copolymer (90:10) |
| PP-30 | Ethyl acrylate-tert-butyl methacrylate-2-acrylamido-2-methylpropanesulfonic acid copolymer (35:60:5) |
| PP-31 | tert-Butyl acrylate-tetrahydrofurfuryl acrylate-2-methylpropanesulfonic acid copolymer (50:40:10) |
| PP-32 | tert-Butyl acrylate-methacrylate of polyethylene glycol monomethyl ether (the repeating number of ethyleneoxy chains: 23) -2-acrylamido-2-methyl-propanesulfonic acid copolymer (70:27:3) |
| PP-33 | Isobutyl acrylate-N-vinylpyrrolidone-2-acrylamido-2-methylpropanesulfonic acid copolymer (65:30:5) |
| PP-34 | Isobutyl methacrylate-sodium 2-acrylamido-2-methylpropanesulfonate copolymer (88:12) |
| PP-35 | n-Butyl acrylate-tert-butyl methacrylate-vinylsulfonic acid copolymer (30:60:10) |
| PP-36 | Ethyl acrylate-tert-butyl methacrylate-vinylsulfonic acid copolymer (30:60:10) |
| PP-37 | Ethyl acrylate-2-acrylamido-2-methylbutanesulfonic acid copolymer (90:10) |

Of the above-mentioned dissociative group-containing polymers, specific examples of the condensation polymers are enumerated below, but are not limited thereto. Acidic groups in respective polymers are all indicated in the undissociated form. As to the polymers formed by the condensation reaction such as polyesters and polyamides, the constituent components thereof are indicated by dicarboxylic acids, diols, diamines, hydroxycarboxylic acids or aminocarboxylic acids. The ratios in parentheses mean molar percent ratios of the respective components.

TABLE 3

| | |
|---|---|
| PP-38 | 4,4'-Diphenylmethane diisocyanate/hexamethylene diisocyanate/tetraethylene glycol/ethylene glycol/2,2-bis (hydroxymethyl)propionic acid (40/10/20/20/10) |
| PP-39 | 4,4'-Diphenylmethane diisocyanate/hexamethylene diisocyanate/butanediol/polyethylene glycol (Mw = 400)/2,2-bis(hydroxymethyl)propionic acid (40/10/20/10/20) |
| PP-40 | 1,5-Naphthylene diisocyanate/butanediol/4,4'-dihydroxy-diphenyl-2,2'-propane/polypropylene glycol (Mw = 400)/2,2-bis(hydroxymethyl)propionic acid (50/20/5/10/15) |
| PP-41 | 1,5-Naphthylene diisocyanate/hexamethylene diisocyanate/2,2-bis(hydroxymethyl)butanoic acid/polybutylene oxide (Mw = 500) (35/15/25/25) |
| PP-42 | Isophorone diisoxyanate/diethylene glycol/neopentyl glycol/2,2-bis(hydroxymethyl)propionic acid (50/20/20/10) |
| PP-43 | Toluene diisocyanate/2,2-bis(hydroxymethyl)butanoic acid/polyethylene glycol (Mw = 1000)/cyclohexanedimethanol (50/10/10/30) |
| PP-44 | Diphenylmethane diisocyanate/hexamethylene diisocyanate/tetraethylene glycol/butanediol/3,5-di(2-hydroxy)ethyloxycarbonylbenzenesulfonic acid (40/10/10/33/7) |
| PP-45 | Diphenylmethane diisocyanate/hexamethylene diisocyanate/butanediol/ethylene glycol/2,2-bis(hydroxymethyl)butanoic acid/3,5-di(2-hydroxy)ethyloxycarbonylbenzenesulfonic acid (40/10/20/15/10/5) |
| PP-46 | Terephthalic acid/isophthalic acid/5-sulfoisophthalic acid/ethylene glycol/neopentyl glycol (24/24/2/25/25) |
| PP-47 | Terephthalic acid/isophthalic acid/5-sulfoisophthalic acid/cyclohexanedimethanol/1,4-butanediol/ethylene glycol (22/22/6/25/15/10) |
| PP-48 | Isophthalic acid/5-sulfoisophthalic acid/cyclohexanedimethanol/ethylene glycol (40/10/40/10) |
| PP-49 | Cyclohexanedicarboxylic acid/isophthalic acid/3,5-di(2-hydroxy)ethyloxycarbonylbenzenesulfonic acid/cyclohexanedimethanol/ethylene glycol (30/20/5/25/20) |
| PP-50 | 11-Aminoundecanoic acid (100) |
| PP-51 | 12-Aminododecanoic acid (100) |
| PP-52 | Reaction product of poly(12-aminododecanoic acid) and maleic anhydride (100) |
| PP-53 | 11-Aminoundecanoic acid/7-aminoheptanoic acid (50/50) |
| PP-54 | Hexamethylenediamine/adipic acid (50/50) |
| PP-55 | N,N-Dimethylethylenediamine/adipic acid/Cyclohexanedicarboxylic acid (50/20/30) |
| PP-56 | Toluene diisocyanate/hexamethylenediamine/2,2-bis(hydroxymethyl)propionic acid (50/40/10) |
| PP-57 | 11-Aminoundecanoic acid/hexamethylenediamine/urea (34/33/33) |

The above-mentioned dissociative group-containing condensation polymers can be synthesized by known methods described in "Polymer Experimentation (Vol. 5), Polycondensation and Polyaddition" edited by Shu Kanbara, Kyoritsu Shuppan (1980), Eiichiro Takiyame, "Polyester Resin Handbook", Nikkan Kogyo Shinbunsha (1988), "Polyurethane Resin Handbook", edited by Keiji Iwata, Nikkan Kogyo Shinbunsha (1987), Takayuki Otsu and Masayoshi Kinosita, "Experiments of Polymer Synthesis", Kagaku Dojin (1972), JP-B-33-1141, JP-B-37-7641, JP-B-39-5989, JP-B-40-27349, JP-B-42-5118, JP-B-42-24194, JP-B-45-10957, JP-B-48-25435, JP-B-49-36942, JP-B-52-81344, JP-A-56-88454 and JP-A-6-340835.

For preventing nozzles from being clogged with solutions containing the dispersion of fine polymer particles in forming images, it is preferred that the dispersion of fine polymer particles used in the invention have a glass transition temperature (Tg) higher than the ejecting temperature of the solutions. The dispersions having a Tg 10° C. higher than the ejecting temperature is more preferred, and ones having a Tg of 40° C. to 160° C. are most preferred.

The solid amount of the dispersion of fine polymer particles applied onto image-receiving materials is preferably from 0.1 g/m$^2$ to 10 g/m$^2$, and more preferably from 0.2 g/m$^2$ to 5 g/m$^2$.

[High-Boiling Point Organic Solvents]

The boiling point of the high-boiling point organic solvents available in the invention is preferably 150° C. or more, and more preferably 170° C. or more.

The high-boiling point organic solvents used in the invention include phthalates (for example, dibutyl phthalate, dioctyl phthalate, dicyclohexyl phthalate, di-2-ethylhexyl phthalate, decyl phthalate, bis(2,4-di-tert-amylphenyl) isophthalate and bis(1,1-diethylpropyl) phthalate), phosphates or phosphonates (for example, diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tri-dodecyl phosphate and di-2-ethylhexylphenyl phosphate), benzoates (for example, 2-ethylhexyl benzoate, a 2,4-dichlorobenzoate, dodecyl benzoate and 2-ethylhexyl p-hydroxybenzoate), amides (for example, N,N-diethyldodecaneamide and N,N-diethyllaurylamide), alcohols (for example, isostearyl alcohol), aliphatic esters (for example, dibutoxyethyl succinate, di-2-ethylhexyl succinate, 2-hexyldecyl tetradecanoate, tributyl citrate, diethyl azelate, isostearyl lactate and trioctyl citrate), aniline derivatives (for example, N,N-dibutyl-2-butoxy-5-tert-octylaniline), chlorinated paraffins (for example, paraffins having a chlorine content of 10% to 80%), trimesates (for example, tributyl trimesate), dodecylbenzene, diisopropylnaphthalene, phenols (for example, 2,4-di-tert-amylphenol, 4-dodecyloxyphenol, 4-dodecyloxycarbonylphenol and 4-(4-dodecyloxyphenylsulfonyl)phenol), carboxylic acids (for example, 2-(2,4-di-tert-amylphenoxybutyric acid and 2-ethoxyoctanedecanoic acid), and alkylphosphoric acids (for example, di-(2-ethylhexyl)phosphoric acid and diphenyl-phosphoric acid).

The high-boiling point organic solvent is used preferably in a 0.01-fold to 10-fold amount by weight ratio, and more preferably in a 0.05-fold to 5-fold amount by weight ratio, based on the dye.

These high-boiling point organic solvents may be either alone, or as a mixture of several kinds of them (for example, tricresyl phosphate and dibutyl phthalate, trioctyl phosphate and di(2-ethylhexyl) sebacate, and dibutyl phthalate and poly(N-tert-butylacrylamide)).

Compound examples of the high-boiling point organic solvents other than the above, which are used in the invention, and/or methods for synthesizing these high-boiling point organic solvents are described, for example, in U.S. Pat. Nos. 2,322,027, 2,533,514, 2,722,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,027,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276, 319, EP-A-286,253, EP-A-289,820, EP-A-309,158, EP-A-309,159, EP-A-309,160, EP-A-509,311, EP-A-510,576, East German Patents 147,009, 157,147, 159,573 and 225, 240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-0165, JP-A-4-232946 and JP-A-4-346338.

The above-mentioned high-boiling point organic solvent is used preferably in a 0.01-fold to 10-fold amount by weight, and more preferably in a 0.05-fold to 5-fold amount by weight, based on the dye.

[Dispersion by Emulsification]

When the dyes or the high-boiling point organic solvents are hydrophobic in the invention, they are used as dispersions obtained by emulsifying them in aqueous media. In dispersion by emulsification, low boiling organic solvents can be used in some cases from the viewpoint of emulsifiability. The low boiling organic solvents are organic solvents having a boiling point of about 30° C. to about 150° C. at atmospheric pressure, and examples of the solvents preferably used include but are not limited to esters (for example, ethyl acetate, butyl acetate, ethyl propionate, β-ethoxyethyl acetate and methyl cellosolve acetate), alcohols (for example, isopropyl alcohol, n-butyl alcohol and sec-butyl alcohol), ketones (for example, methyl isobutyl ketone, methyl ethyl ketone and cyclohexanone), amides (for example, dimethylformamide and N-methylpyrrolidone), and ethers (for example, tetrahydrofuran and dioxane).

Dispersion by emulsification is conducted for dispersing an oily phase dissolved in the high-boiling point organic solvent or the mixed solvent of the high-boiling point organic solvent and the low boiling solvent according to circumstances, in an aqueous phase mainly composed of water to prepare minute oil droplets of the oily phase. In this case, additives such as a surfactant, a detergent, a dye stabilizer, an emulsion stabilizer, a preservative and a mildewproofing agent can be added to either of the aqueous phase and the oily phase or both as needed.

As the emulsification method, there is generally used a method of adding the oily phase to the aqueous phase. However, a so-called phase reversal emulsification method can also be preferably used in which the aqueous phase is added dropwise to the oily phase.

In dispersion by emulsification in the invention, various surfactants can be used. Examples of the surfactants preferably used include anionic surfactants such as fatty acid salts, alkylsulfate ester salts, alkylbenzenesulfonates, alkylnaphthalenesulfonates, dialkylsulfosuccinates, alkylphosphate ester salts, naphthalenesulfonate-formalin condensates and polyoxyethylene alkyl sulfate ester salts, and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerol fatty acid esters and oxyethylene-oxypropylene block copolymers. Surfynols (Air Products & Chemicals), an acetylene polyoxyethylene oxide surfactant, is also preferably used. Amine oxide type amphoteric surfactants such as N,N-dimethyl-N-alkylamine oxides are also preferred. Further, surfactants described in JP-A-59-157636, pages 37 and 38, and Research Disclosure, No. 308119 (1989) can also be used.

For stabilizing the dispersions immediately after emulsification, water-soluble polymers can also be added together with the above-mentioned surfactants. As the water-soluble polymers, there are preferably used polyvinyl alcohol, polyvinyl pyrrolidone, polyethylene oxide, polyacrylic acid, polyacrylamide and copolymers thereof. Natural water-soluble polymers such as polysaccharides, casein and gelatin are also preferably used. Further, for stabilizing the dye dispersions, vinyl polymers obtained by polymerization of acrylates, methacrylates, vinyl esters, acrylamide and derivatives thereof, methacrylamide and derivatives thereof, olefins, styrene and derivatives thereof, vinyl ethers, acrylonitrile and derivatives thereof, which are substantially insoluble in aqueous media, polyurethanes, polyesters, polyamides, polyureas or polycarbonates can also be used together. It is preferred that these polymers contain $-SO^{2-}$ or $-COO^-$. When these polymers which are substantially insoluble in aqueous media are used together, high-boiling point organic solvents are used preferably in an amount of 20% by weight or less, and more preferably in an amount of 10% by weight or less.

When the hydrophobic dyes are dispersed by emulsification to prepare water-based ink, particularly important is particle size control thereof. For raising the color purity and the density at the time when images are formed by ink jet, it is indispensable to reduce the average particle size. The average particle size is preferably from 3 nm to 100 nm by the volume average particle size.

The term "volume average particle size" means the average particle size weighted with the particle volume, and the total of the products of respective particle diameters and volumes thereof divided by the total volume of the particles. The volume average particle size is described in Soichi Muroi, "Chemistry of Synthetic Latexes" (published by Kobunshi Kankokai), page 119.

The volume average particle size of the above-mentioned dispersed particles can be easily measured by known methods such as methods described in "Experimental Chemistry Course", the fourth edition, pages 417 and 418, as well as static light-scattering methods, dynamic light-scattering methods and centrifugal sedimentation methods. For example, the dispersion is diluted with distilled water so that the concentration of the particles contained in ink reaches 0.1% to 1% by weight, and then, the volume average particle size thereof can be easily measured with a commercially available volume average particle size measuring instrument (for example, Micro Track UPA manufactured by Nikkiso Co., Ltd.). Further, the dynamic light-scattering method utilizing the laser Doppler effect is particularly preferred because the measurement of small particle size is possible.

It has been revealed that the presence of coarse particles also plays a very major role for printing performance. That is to say, it has been proved that a nozzle of a head is clogged with coarse particles, or coarse particles form stains even if the nozzle is not clogged, which causes a failure to eject ink or a twist of ejected ink to have a profound influence on printing performance. In order to prevent this, it is important to restrain the number of particles having a size of 5 μm or more to 10 particles or less per μl of ink, and the number of particles having a size of 1 μm or more to 1000 particles or less per μl of ink.

As methods for removing these coarse particles, there can be used known centrifugal separation methods and microfiltration methods. These separating means may be applied immediately after dispersion by emulsification, or after addition of various additives such as a detergent and a surfactant to the emulsified dispersion and immediately before charging the dispersion into ink cartridges.

As an effective means for reducing the average particle size and removing coarse particles, there can be used a mechanical emulsifier.

As the emulsifiers, there can be used known apparatus of a simple stirrer or impeller stirring system, an in-line stirring system, a mill system (for example, a colloid mill) and an ultrasonic system. However, the use of a high-pressure homogenizer is particularly preferred.

As to the high-pressure homogenizer, its detailed mechanism is described in U.S. Pat. No. 4,533,254 and JP-A-6-

47264. Commercially available apparatus include Gaulin Homogenizer (A. P. V. Gaulin Inc.), Microfluidizer (Microfluidex Inc.) and Artimizer (Sugino Machine Co., Ltd.).

Further, a high-pressure homogenizer provided with a mechanism for finely graining particles in an extra-high pressure jet stream as recently described in U.S. Pat. No. 5,720,551 is particularly effective for dispersion by emulsification of the invention. Examples of the emulsifiers using the extra-high pressure jet streams include De Bee 2000 (Bee International Ltd.).

When the particles are emulsified with the high-pressure emulsifiers, the pressure is 500 bars or more, preferably 600 bars or more, and more preferably 1800 bars or more.

For example, the use of two or more kinds of emulsifiers in combination, such as treatment with a high-pressure homogenizer after emulsification with a stirring emulsifier, is particularly preferred. Further, a method is also preferred in which after the particles are once dispersed by emulsification with the emulsifier, additives such as a detergent and a surfactant are added, and then, the emulsified dispersion is allowed to pass through the high-pressure homogenizer again before ink is charged into cartridges.

When the low boiling organic solvents are contained together with the high-boiling point organic solvents, the low boiling organic solvents are preferably removed from the viewpoints of the stability of the emulsions, and the safety and sanitation. As methods for removing the low boiling organic solvents, various known methods can be used depending on the kind of solvent. That is to say, evaporation methods, vacuum evaporation methods and ultrafiltration methods can be used. It is preferred that the low boiling organic solvents are removed as soon as possible after emulsification.

[Additives]

In the invention, additives can be appropriately selected to use them in proper amounts. Such additives include an anti-drying agent for preventing an ink jet outlet from being clogged with an ink composition for ink-jet recording due to drying, a penetration accelerator for allowing ink to penetrate paper better, an UV absorber, an antioxidant, a viscosity modifier, a surface tension regulator, a dispersing agent, a mildewproofing agent, a corrosion inhibitor, a pH adjusting agent, an antifoaming agent and a chelating agent.

As the anti-drying agents used in the invention, water-soluble organic solvents having a lower vapor pressure than water are preferred. Specific example thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerol and trimethylolpropane; lower alkyl ethers of polyhydric alcohols such as ethylene glycol monomethyl (or ethyl) ether, diethylene glycol monomethyl (or ethyl) ether and triethylene glycol monomethyl (or butyl) ether, heterocycles such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; multifunctional compounds such as diacetone alcohol and diethanolamine; and urea derivatives. Of these, polyhydric alcohols such as glycerol and diethylene glycol are more preferred. The above-mentioned anti-drying agents may be used either alone or as a combination of two or more of them. These anti-drying agents are preferably contained in ink in an amount of 10% to 50% by weight.

Details of these are described in "Dictionary of Antibacterial and Mildewproofing Agents", edited by Editional Committee of Dictionary, Nippon Bokin Bobai Gakkai.

The corrosion inhibitors include, for example, an acid sulfite, sodium thiosulfate, ammonium thioglycolate, diisopropylammonium nitrite, pentaerythritol tetranitrate, dicyclohexylammonium nitrite and benzotriazole. They are preferably used in ink in an amount of 0.02% to 5.00% by weight.

The penetration accelerators used in the invention include alcohols such as ethanol, isopropanol, butanol, diethylene glycol monobutyl ether, triethylene glycol monobutyl ether and 1,2-hexanediol, sodium laurylsulfate, sodium oleate and the nonionic surfactants mentioned above as the surfactants for dispersion by emulsification. They shows the sufficient effect when contained in ink in an amount of 10% to 30% by weight, and are preferably added within such a range that no blur of printing and no print through occur.

The UV absorbers used for improving the keeping quality of images in the invention include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure, No. 24239; and compounds represented by stilbene and benzoxazole compounds, which absorb ultraviolet rays to emit fluorescence, so-called fluorescent brightening agents.

As the antioxidants used for improving the keeping quality of images in the invention, there can be used various organic and metal complex antifading agents. The organic antifading agents include hydroquinone and derivatives thereof, alkoxyphenols, dialkoxyphenols, phenols, aniline and derivatives thereof, amines, indan and derivatives thereof, chroman and derivatives thereof, alkoxyanilines and heterocycles, and the metal complex antifading agents include nickel complexes and zinc complexes. More specifically, compounds described in patents cited in Research Disclosure, No. 17643, Items VII-I to J, ibid., No. 15162, ibid., No. 18716, page 650, left column, ibid., No. 36544, page 527, ibid., No. 307105, page 872, and ibid., No. 15162, and compounds contained in general formulas and compound examples of typical compounds described in JP-A-62-215272, pages 127 to 137 can be used.

The mildewproofing agents used in the invention include sodium dehydroacetate, sodium benzoate, sodium pyridinethione-1-oxide, ethyl p-hydroxybenzoate and 1,2-benzoisothiazoline-3-one. They are preferably used in ink in an amount of 0.02% to 1.00% by weight.

The pH adjusting agents used in the invention include hydroxides of alkali metals such as lithium hydroxide and potassium hydroxide; carbonates such as sodium carbonate and sodium hydrogencarbonate; inorganic bases such as potassium acetate, sodium silicate and disodium phosphate; and organic bases such as N-methyldiethanolamine and triethanolamine. For improving the stability of ink, the pH is preferably from 6 to 10, and more preferably from 7 to 10.

The surface tension regulators used in the invention include nonionic, cationic and anionic surfactants. The anionic surfactants include, for example, fatty acid salts, alkylsulfate ester salts, alkylbenzenesulfonates, alkylnaphthalenesulfonates, dialkylsulfosuccinates, alkylphosphate ester salts, naphthalenesulfonate-formalin condensates and polyoxyethylene alkyl sulfate ester salts. The nonionic surfactants include polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerol fatty acid esters and oxyethylene-oxypropylene block copolymers. Surfynols (Air Products & Chemicals), an acetylene polyoxyethylene oxide surfactant, is also preferably used. Amine oxide type amphoteric surfactants such as N,N-dimethyl-N-alkylamine oxides are also preferred. Further, surfactants described in JP-A-59-157636, pages 37 and 38, and Research Disclosure, No. 308119 (1989) can also be used. It is preferred that the surfactants used herein have a solubility in water at 25° C. of 0.5% or more.

The surface tension of the ink of the invention is preferably from 20 mN/m·s to 60 mN/m·s, and more preferably from 25 mN/m·s to 45 mN/m·s, using or not using these surface tension regulators.

The ink of the invention preferably has a viscosity of 30 mPa·s or less. It is more preferred that the viscosity is adjusted to 20 mPa·s or less.

The surface tension of the dispersion of fine polymer particles according to the present invention is preferably from 20 to 60 mN/m, more preferably from 25 to 45 mN/m, with or without using the surfactant.

The viscosity of the dispersion of fine particles according to the present invention is preferably not more than 30 mPa·s., more preferably not more than 20 mPa·s.

Accordingly, the viscosity modifier is sometimes used fro adjusting the viscosity. The viscosity modifiers include, for example, celluloses, water-soluble polymers such as polyvinyl alcohol, and nonionic surfactants.

In the invention, the above-mentioned various cationic, anionic and nonionic surfactants can also be used as the dispersing agents and dispersion stabilizers, and fluorine and silicone compounds and chelating agents represented by EDTA as the antifoaming agents, as needed.

In forming images by the ink-jet image recording method of the invention, there can be used known materials on which the images are recorded, that is to say, plain paper, resin-coated paper, paper for ink-jet use only described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, films, paper for both ink-jet and electrophotographic uses, cloths, glass, metal and ceramics.

The recording paper and recording films used for forming images by the ink-jet image recording method of the invention will be described below. Supports used in the recording paper and recording films are composed of chemical pulp such as LBKP or NBKP, mechanical pulp such as GP, PGW, RMP, TMP, CTMP, CMP or CGP, or waste paper pulp such as DIP, and prepared with various machines such as a Fourdrinier paper machine and a cylinder paper machine, adding known additives such as a pigment, a binder, a size agent, a fixing agent, a cationic agent and a paper strong agent as needed. In addition to these support, either of synthetic paper and plastic film sheets may also be used. The thickness of the supports is desirably from 10 μm to 250 μm, and the basis weight is preferably from 10 g/m² to 250 g/m². The supports may be provided with ink receiving layers and back coat layers as such, or after size pressing with starch or polyvinyl alcohol or formation of anchor coat layers. Further, the supports may be subjected to flattening treatment using calendering machines such as a machine calender, a TG calender and a soft calender. In the invention, paper laminated with a polyolefin (e.g., polyethylene, polystyrene, polyethylene terephthalate, polybutene, a copolymer thereof) on both sides, and plastic films are preferably used as the supports. It is preferred that a white pigment (e.g., titanium oxide, zinc oxide) or a coloring dye (e.g., cobalt blue, ultramarine blue, neodymium oxide) is added to the polyolefin.

Pigments and water-soluble binders are contained in the ink receiving layers provided on the supports. White pigments are preferred as the pigments, and include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene pigments, acrylic pigments, urea resins and melamine resins. As the white pigments contained in the ink receiving layers, porous inorganic pigments are preferred, and particularly, synthetic amorphous silica having a large pore area is suitable. Although both silicic acid anhydride obtained by the dry process and hydrous silicilic acid obtained by the wet process are available as synthetic amorphous silica, the use of hydrous silicilic acid is particularly preferred. These pigments may be used as a combination of two or more of them.

The aqueous binders contained in the ink receiving layers include water-soluble polymers such as polyvinyl alcohol, silanol-modified polyvinyl alcohol, starch, cationized starch, casein, gelatin, carboxymethyl cellulose, hydroxyethyl cellulose, polyvinyl pyrrolidone, a polyalkylene oxide and a polyalkylene oxide derivative; and water-dispersible polymers such as a styrene-butadiene latex and an acrylic emulsion. These aqueous binders can be used either alone or as a combination of two or more of them. In the invention, of these, polyvinyl alcohol and silanol-modified polyvinyl alcohol are particularly suitable in terms of adhesion to the pigments and separation resistance of the ink receiving layers.

The ink receiving layers can contain additives such as mordants, water resistance imparting agents, light resistance improvers, surfactants, hardening agents and the like, as well as the pigments and the aqueous binders.

It is preferred that the mordants to be added to the ink receiving layers are immobilized. For that purpose, polymer mordants are preferably used. The polymer mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. Image-receiving materials containing the polymer mordants described in JP-A-1-161236, pages 212 to 215, are particularly preferred. The use of the mordants described therein provides images having excellent image quality, and improves light resistance of images.

The water resistance imparting agents are effective for imparting water resistance to images, and as these water resistance imparting agents, cationic resins are particularly desirable. Such cationic resins include polyamide polyamine epichlorohydrin, polyethyleneimine, polyaminesulfone, dimethyldiallylammonium chloride polymer, cationic polyacrylamide and colloidal silica. Of these cationic resins, polyamide polyamine epichlorohydrin is particularly suitable. The content of these cationic resins is preferably from 1% to 15% by weight, and particularly preferably from 3% to 10% by weight, based on the total solid content of the ink receiving layer.

The light resistance improvers include zinc sulfate, zinc oxide, hindered amine antioxidants and benzotriazole UV absorbers such as benzophenone. Of these, zinc sulfate is particularly preferred.

The surfactants act as coating aids, separation improvers, slipperiness improvers or antistatic agents. The surfactants are described in JP-A-62-173463 and JP-A-62-183457.

Organic fluoro compounds may be used instead of the surfactants. The organic fluoro compounds are preferably hydrophobic. Examples of the organic fluoro compounds include fluorine surfactants, oily fluorine compounds (for example, fluorine oil) and solid fluorine compound resins (for example, tetrafluoroethylene resin). The organic fluoro compounds are described in JP-B-57-9053 (columns 8 to 17), JP-A-61-20994 and JP-A-62-135826.

As the hardening agents, there can be used materials described in JP-A-1-161236, page 222.

Other additives added to the ink receiving layers include pigment dispersing agents, thickening agents, antifoaming agents, dyes, fluorescent brightening agents, preservatives, pH adjusting agents, matte agents and hardening agents. The ink receiving layer may be either of one layer or of two layers.

The recording paper and the recording films can also be provided with back coat layers, and components which can be added to these layers include white pigments, aqueous binders and other components. The white pigments contained in the back coat layers include, for example, white inorganic pigments such as precipitated calcium carbonate, heavy calcium carbonate, kaolin, talc, calcium sulfate, barium sulfate, titanium dioxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrous halloysite, magnesium carbonate and magnesium hydroxide, and organic pigments such as styrene plastic pigments, acrylic plastic pigments, polyethylene microcapsules, urea resins and melamine resins.

The aqueous binders contained in the back coat layers include water-soluble polymers such as a styrene/maleate copolymer, a styrene/acrylate copolymer, polyvinyl alcohol, silanol-modified polyvinyl alcohol, starch, cationized starch, casein, gelatin, carboxymethyl cellulose, hydroxyethyl cellulose and polyvinyl pyrrolidone; and water-dispersible polymers such as a styrene-butadiene latex and an acrylic emulsion.

Other components contained in the back coat layers include antifoaming agents, foam inhibitors, dyes, fluorescent brightening agents, preservatives and water resistance imparting agents.

Dispersion of fine polymer particles may be added to the constituent layers (including the back coat layers) of the ink-jet recording paper and the recording films. The dispersion of fine polymer particles are used for improving film properties such as dimensional stability, curl prevention, adhesion prevention and crack prevention of films. The dispersion of fine polymer particles are described in JP-A-62-245258, JP-A-62-136648 and JP-A-62-110066. Addition of the dispersion of fine polymer particles having a low glass transition temperature (of 40° C. or less) to a mordant-containing layer can prevent cracks and curls of the layer. Further, addition of the dispersion of fine polymer particles having a high glass transition temperature can also prevent curls of the layer.

There is no limitation on the ink-jet recording system utilized in the invention, and known systems are used. Such systems include a charge control system of ejecting ink utilizing electrostatic attracting force, a drop-on-demand system (pressure pulse system) utilizing vibration pressure of piezoelectric elements, an acoustic ink-jet system of ejecting ink by converting electric signals to acoustic beams, irradiating the ink with the beams, and utilizing the resulting radiation pressure, and a thermal ink-jet (bubble jet) system of heating ink to form air bubbles and utilizing the resulting pressure.

The ink-jet recording systems include a system of injecting ink having a low concentration called photo ink as a number of droplets small in volume, a system of sing a plurality of ink compositions substantially identical in hue and different in density to improve image quality, and a system using colorless and transparent ink.

EXAMPLE

The invention will be further illustrated with reference to the following examples, which are, however, not to be construed as limiting the invention.

(Preparation of Ink Set 101)

Dye (A-1) (8 g) and 40 g of a surfactant (trade name: Emal 20C manufactured by Kao Corp.) were dissolved in 6 g of high-boiling point organic solvent (S-1), 10 g of high-boiling point organic solvent (S-2) and 50 ml of ethyl acetate at 70° C. To the resulting solution, 500 ml of deionized water was added while stirring with a magnetic stirrer to prepare an oil-in-water crude particle dispersion.

Then, the crude dispersion was passed 5 times through a Microfluidizer (Microfluidex Inc.) at a pressure of 600 bars, thereby forming fine particles. Further, for the resulting emulsion, desolvation was performed with a rotary evaporator until the odor of ethyl acetate was removed.

To the fine emulsion of the hydrophobic dye obtained as described above, 140 g of diethylene glycol, 64 g of glycerol and additives such as urea were added, and then, 900 ml of deionized water was added thereto, followed by adjustment to pH 9 with 10 mol/l of KOH, thereby preparing light magenta ink according to Table 4. The volume average particle size of the resulting emulsified dispersion ink was measured with a Microtrack UPA (manufactured by Nikkiso Co., Ltd.). As a result, it was 51 nm.

Furthermore, changing the kind and amount of dye, the amounts of high-boiling point organic solvents, and the kinds and amounts of various additives, magenta ink, light cyan ink, cyan ink, yellow ink and black ink of ink set 101 were prepared.

Shown in Table 4 is the composition of final compositions after evaporation of solvents. The all of values of each component in table 4 stated in the unit of g/l (gram/liter)

TABLE 4

|  | Light Magenta | Magenta | Light Cyan | Cyan | Yellow | Black |
|---|---|---|---|---|---|---|
| Dye | M-7 | M-7 | A-2 | A-2 | A-3 | M-7 10.0 |
|  | 5.00 | 20.0 | 9.3 | 37.2 | 27.2 | A-2 18.6 |
|  | g/l |  |  |  |  | A-3 13.6 |
| High Boiling Organic Solvent | S-1 3.25 | 14.52 | 6.75 | 27.0 | 19.74 | 30.6 |
|  | S-2 6.25 | 25.52 | 11.9 | 47.6 | 34.7 | 53.8 |
| Emal 20 C | 25.0 | 100 | 46.5 | 186.0 | 136.0 | 211.0 |
| Diethylene Glycol | 87.5 | 87.5 | 87.5 | 87.5 | 87.5 | 87.5 |

TABLE 4-continued

| | Light Magenta | Magenta | Light Cyan | Cyan | Yellow | Black |
|---|---|---|---|---|---|---|
| Urea | 46.0 | 46.0 | 46.0 | 46.0 | 46.0 | 46.0 |
| Glycerol | 40.0 | 40.0 | 40.0 | 40.0 | 40.0 | 40.0 |
| Triethanolamine | 7.5 | 7.5 | 7.5 | 7.5 | 7.5 | 7.5 |
| Benzotriazole | 0.075 | 0.075 | 0.075 | 0.075 | 0.075 | 0.075 |
| Proxel XL2 | 2.5 | 2.5 | 2.5 | 2.5 | 2.5 | 2.5 |
| Deionized water to make 1 liter | | | | | | |

Immediately after printing, a solution obtained by diluting dispersion of fine polymer particles P-1 with deionized water to a solid content of 5% by weight was ejected by use of an ink-jet printer, applied onto the image so as to give an amount of the dispersion of fine polymer particles coated of 0.5 g/m$^2$, and further heat treated with hot air (100° C.) after coating to prepare sample 201.

Similarly, samples 202 to 209 were prepared according to Table 5. The amount of latex coated was adjusted to 0.5 g/m$^2$, and further treated with hot air (100° C.) after coating to prepare sample 202 to 209. When two kinds of dispersion of fine polymer particles were combined, they were mixed at the same weight ratio.

Dispersion of fine polymer particles P-1 was added to each color composition of ink set 101 so that solid matter is contained in the ink at a concentration of 5%, and similarly applied by use of the above-mentioned ink-jet printer to prepare sample 210 without heat treatment.

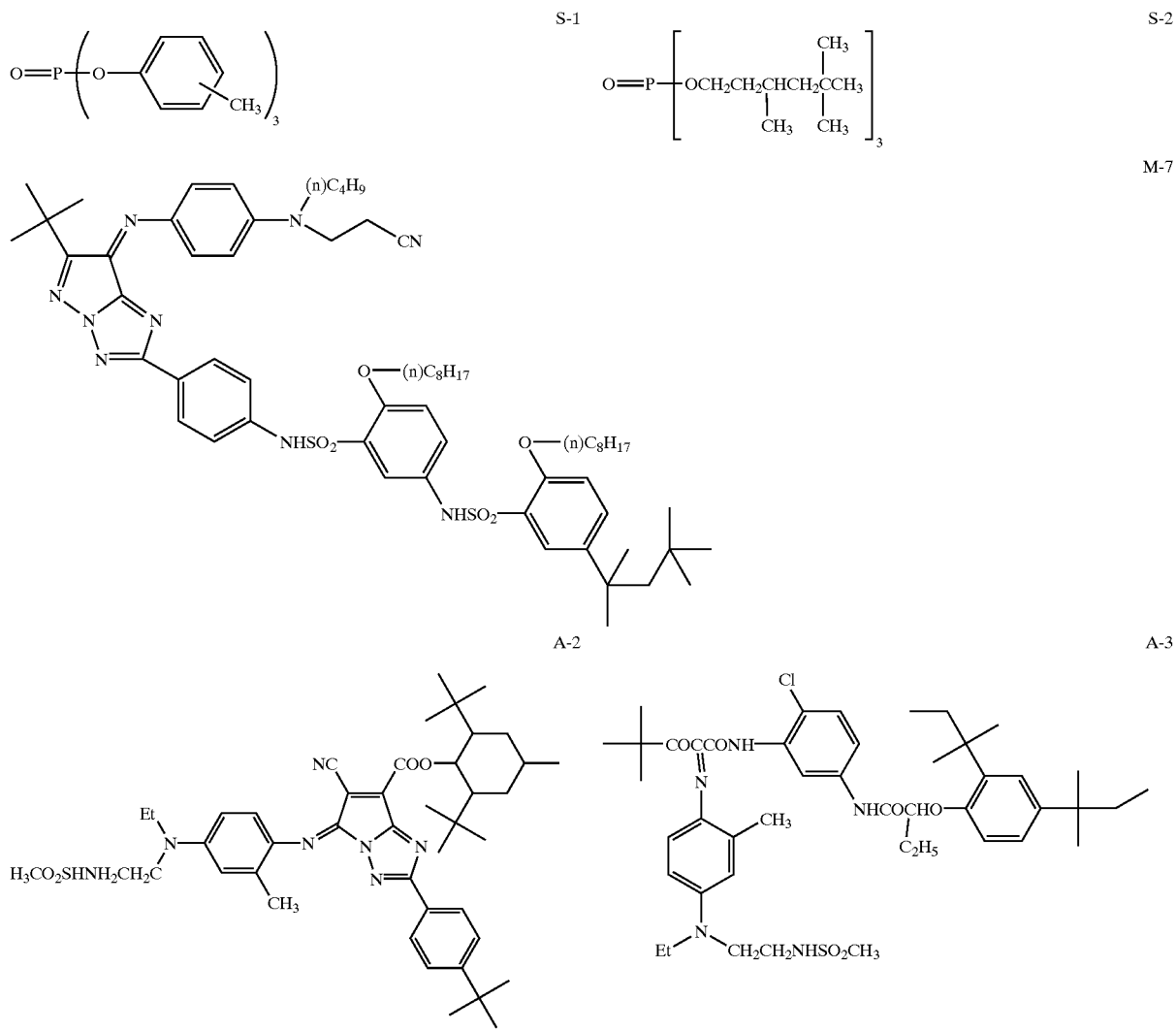

Example 1

Ink set 101 was charged into cartridges of an ink-jet printer PM670C (manufactured by Seiko Epson Corporation), and an image was printed on ink-jet paper, photo glossy paper EX, manufactured by Fuji Photo Film Co., Ltd. by use of the same printer.

The following evaluations were made for the samples prepared.

(1) Light Fastness

The image density Ci immediately after printing was measured with an X-rite 310, and then, the image was irradiated with xenon light (85,000 luxes) by use of a weather meter (manufactured by Atlas Co.) for 10 days.

Then, the image density Cf was measured again, and the dye remaining rate (Cf/Ci)×100 was determined to conduct evaluation. The dye remaining rate was evaluated at three reflection intensities of 1, 1.5 and 2. When the dye remaining rate was 70% or more at all intensities, the light fastness was rated as A. When less than 70% at two intensities, the light fastness was rated as B, and when less than 70% at all intensities, the light fastness was rated as C.

(2) Heat Fastness

The image densities before and after storage at 80° C. for 10 days were measured with an X-rite 310 to determine the dye remaining rate, thereby evaluating the heat fastness. The dye remaining rate was evaluated at three reflection intensities of 1, 1.5 and 2. When the dye remaining rate was 90% or more at all intensities, the heat fastness was rated as A. When less than 90% at two intensities, the heat fastness was rated as B, and when less than 90% at all intensities, the heat fastness was rated as C.

(3) Water Resistance

The samples were immersed in still water for 10 seconds. When no change was observed at all, the water resistance was rated as A, and when a blur was slightly observed, the water resistance was rated as B. When a blur was extremely developed to lower image quality, the water resistance was rated as C.

Results obtained are shown in Tables 5 and 6.

TABLE 5

| Sample No. | Dispersion of fine polymer particles | Water Resistance | Note |
|---|---|---|---|
| 201 | P-1 | A | Invention |
| 202 | P-2 | A | Invention |
| 203 | P-4 | A | Invention |
| 204 | P-1 P-5 | A | Invention |
| 205 | PP-1 | A | Invention |
| 206 | PP-2 | A | Invention |
| 207 | PP-3 | A | Invention |
| 208 | PP-1 PP-5 | A | Invention |
| 209 | — | B | Comparison |
| 210 | P-1 | B | Comparison |

TABLE 6

| Sample No. | Light Fastness | | | | Heat Fastness | | | | Note |
|---|---|---|---|---|---|---|---|---|---|
| | Y | M | C | Bk | Y | M | C | Bk | |
| 201 | A | A | A | A | A | A | A | A | Invention |
| 202 | A | A | A | A | A | A | A | A | Invention |
| 203 | A | A | A | A | A | A | A | A | Invention |
| 204 | A | A | A | A | A | A | A | A | Invention |
| 205 | A | A | A | A | A | A | A | A | Invention |
| 206 | A | A | A | A | A | A | A | A | Invention |
| 207 | A | A | A | A | A | A | A | A | Invention |
| 208 | A | A | A | A | A | A | A | A | Invention |
| 209 | B | C | C | A | B | C | C | C | Comparison |
| 210 | B | C | C | A | B | C | C | B | Comparison |

Example 2

A solution obtained by diluting dispersion of fine polymer particles P-1 with deionized water to a solid content of 5% by weight was ejected by use of an ink-jet printer, and uniformly applied onto glossy paper so as to give a solid content of the dispersion of fine polymer particles coated of 0.6 g/m². Immediately after that, an image was printed using ink set 101, followed by heat treatment with hot air (100° C.) to prepare sample 301.

Further, in the same manner as with sample 301, dispersion of fine polymer particles P-1 was uniformly applied onto glossy paper so as to give a solid content of the dispersion of fine polymer particles coated of 0.6 g/m², and further treated with hot air (100° C.) after coating. The dispersion of fine polymer particles had formed a coating film, an image was printed using ink set 101 to prepare sample 302 for comparison.

Samples 301 and 302 were evaluated in the same manner as with Example 1. Results obtained are as follows.

TABLE 7

| Sample No. | Dispersion of fine polymer particles | Water Resistance | Note |
|---|---|---|---|
| 301 | P-1 | A | Invention |
| 302 | P-1 | B | Comparison |

TABLE 8

| Sample No. | Light Fastness | | | | Heat Fastness | | | | Note |
|---|---|---|---|---|---|---|---|---|---|
| | Y | M | C | Bk | Y | M | C | Bk | |
| 301 | A | A | A | A | A | A | A | A | Invention |
| 302 | B | C | C | A | B | C | C | C | Comparison |

These results indicate that the samples of the invention are excellent in water resistance, and excellent in image keeping quality such as light fastness and heat fastness.

According to the ink-jet image recording method of the invention, high ejecting stability is obtained, and images having a good hue, and particularly, having excellent water resistance and weather resistance, can be recorded.

The entire disclosure of each and every foreign patent application from which the benefit of foreign priority has been claimed in the present application is incorporated herein by reference, as if fully set forth herein.

What is claimed is:

1. An ink-jet image recording method comprising:
   forming an image by ejecting an ink composition for ink-jet recording comprising an oil-soluble dye onto an image-receiving material;
   applying an aqueous solution comprising a dispersion of fine polymer particles to the image-receiving material simultaneously with or after the forming of an image; and
   heating the image-receiving material to form a coating film comprising the fine polymer particles after applying of the aqueous solution.

2. An ink-jet image recording method comprising:
   applying an aqueous solution comprising a dispersion of fine polymer particles to an image-receiving material;
   ejecting an ink composition for ink-jet recording comprising an oil-soluble dye onto the image-receiving material for formation of an image, while the dispersion of fine polymer particles on the image-receiving material maintains a condition in which the ink composition for ink-jet recording is able to pass therethrough; and
   heating the image-receiving material to form a coating film comprising the fine polymer particles after the applying of the aqueous solution.

3. An ink-jet image recording method comprising:
  forming an image by ejecting an ink composition for ink-jet recording comprising an oil-soluble dye onto an image-receiving material;
  applying a solution comprising a dispersion of fine polymer particles to the image-receiving material simultaneously with or after the forming of an image; and
  heating the image-receiving material to form a coating film comprising the fine polymer particles after the applying of the solution,
  wherein the ink composition comprises a dye dispersion comprising an aqueous medium dispersed therein a high-boiling point organic solvent comprising an oil-soluble dye represented by formula (B-I) or (B-II) dissolved therein:

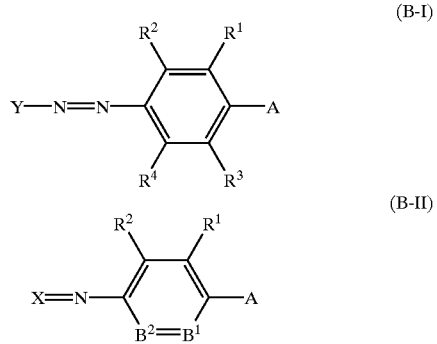

wherein $R^1$, $R^2$, $R^3$ and $R^4$ each independently represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, a carboxyl group or a sulfo group; A represents —$NR^5R^6$ or a hydroxy group; $R^5$ and $R^6$ each independently represents a hydrogen atom, an aliphatic group, an aromatic group or a heterocyclic group; $R^5$ and $R^6$ may combine with each other to form a ring; $B^1$ represents =$C(R^3)$— or =N—; $B^2$ represents —$C(R^4)$= or —N=; $R^1$ and $R^5$, $R^3$ and $R^6$ and/or $R^1$ and $R^2$ may combine with each other to form an aromatic ring or a heterocyclic ring; X represents a photographic color coupler residue; and Y represents an unsaturated heterocyclic group.

4. An ink-jet image recording method comprising:
  applying a solution comprising a dispersion of fine polymer particles to an image-receiving material;
  ejecting an ink composition for ink-jet recording comprising an oil-soluble dye onto the image-receiving material for formation of an image, while the dispersion of fine polymer particles on the image-receiving material maintains a condition in which the ink composition for ink-jet recording is able to pass therethrough; and
  heating the image-receiving material to form a coating film comprising the fine polymer particles after the applying of the solution,
  wherein the ink composition comprises a dye dispersion comprising an aqueous medium dispersed therein a high-boiling point organic solvent comprising an oil-soluble dye represented by formula (B-I) or (B-II) dissolved therein:

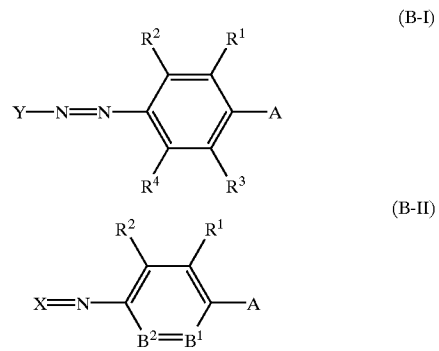

wherein $R^1$, $R^2$, $R^1$ and $R^4$ each independently represents a hydrogen atom, a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphoryl group, an acyl group, a carboxyl group or a sulfo group; A represents —$NR^5R^6$ or a hydroxy group; $R^5$ and $R^6$ each independently represents a hydrogen atom, an aliphatic group, an aromatic group or a heterocyclic group; $R^5$ and $R^6$ may combine with each other to form a ring; $B^1$ represents =$C(R^3)$— or =N—; $B^2$ represents —$C(R^4)$= or —N=; $R^1$ and $R^5$, $R^3$ and $R^6$ and/or $R^1$ and $R^2$ may combine with each other to form an aromatic ring or a heterocyclic ring; X represents a photographic color coupler residue; and Y represents an unsaturated heterocyclic group.

5. The ink-jet image recording method according to claim 1, wherein a glass transition temperature (Tg) of the polymer in the dispersion of fine polymer particles is from 40° C. to 160° C.

6. The ink-jet image recording method according to claim 2, wherein a glass transition temperature (Tg) of the polymer in the dispersion of fine polymer particles is from 40° C. to 160° C.

7. The ink-jet image recording method according to claim 1, wherein a coating amount of the dispersion of fine polymer particles is from 0.1 g/m² to 10 g/m² in terms of the solid content.

8. The ink-jet image recording method according to claim 2, wherein a coating amount of the dispersion of fine polymer particles is from 0.1 g/m² to 10 g/m² in terms of the solid content.

9. The ink-jet image recording method according to claim 1, wherein the polymer in the dispersion of fine polymer is one of a homopolymer and a copolymer both comprising more than 50% by weight of at least one monomer selected from the group consisting of styrene, alkyl acrylate, aryl acrylate, acrylamide and methacrylamide.

10. The ink-jet image recording method according to claim 2, wherein the polymer in the dispersion of fine polymer is one of a homopolymer and a copolymer both comprising more than 50% by weight of at least one monomer selected from the group consisting of styrene, alkyl acrylate, aryl acrylate, acrylamide and methacrylamide.

11. The ink jet image recording method according to claim 1, wherein the polymer in the dispersion of fine polymer particles is a dissociation group-containing polymer selected from the group consisting of a vinyl polymer, polyurethane, polyester, polyamide, polyurea and polycarbonate.

12. The ink jet image recording method according to claim 2, wherein the polymer in the dispersion of fine polymer particles is a dissociation group-containing polymer selected from the group consisting of a vinyl polymer, polyurethane, polyester, polyamide, polyurea and polycarbonate.

13. The ink jet image recording method according to claim 11, wherein the dissociation group-containing polymer is a dissociation group-containing polymer comprising a group selected from the group consisting of a cationic dissociation group and an anionic dissociation group.

14. The ink jet image recording method according to claim 12, wherein the dissociation group-containing polymer is a dissociation group-containing polymer comprising a group selected from the group consisting of a cationic dissociation group and an anionic dissociation group.

15. An ink jet image recording method comprising:
forming an image by ejecting an ink composition for ink-jet recording comprising an oil-soluble dye onto an image-receiving material;
applying a solution comprising a dispersion of fine polymer particles to the image-receiving material simultaneously with or after the forming of an image; and
heating the image-receiving material to form a coating film comprising the fine polymer particles after the applying of a solution,
wherein the polymer in the dispersion of fine polymer particles is a dissociation group-containing polymer selected from the group consisting of a vinyl polymer, polyurethane, polyester, polyamide, polyurea and polycarbonate, and
wherein the content of dissociation groups in the dissociation group-containing polymer is from 0.1 mmol/g to 3.0 mmol/g.

16. An ink jet image recording method comprising:
applying a solution comprising a dispersion of fine polymer particles to an image-receiving material;
ejecting an ink composition for ink-jet recording comprising an oil-soluble dye onto the image-receiving material for formation of an image, while the dispersion of fine polymer particles on the image-receiving material maintains a condition in which the ink composition for ink-jet recording is able to pass therethrough; and
heating the image-receiving material to form a coating film comprising the fine polymer particles after the applying of a solution,
wherein the polymer in the dispersion of fine polymer particles is a dissociation group-containing polymer selected from the group consisting of a vinyl polymer, polyurethane, polyester, polyamide, polyurea and polycarbonate, and
wherein the content of dissociation groups in the dissociation group-containing polymer is from 0.1 mmol/g to 3.0 mmol/g.

17. The ink jet image recording method according to claim 1, wherein the recording is conducted upon an image-receiving material, the image-receiving material comprising an ink receiving layer disposed on a support, with the ink receiving layer including a porous inorganic pigment.

18. The ink jet image recording method according to claim 2, wherein the recording is conducted upon an image-receiving material, the image-receiving material comprising an ink receiving layer disposed on a support, with the ink receiving layer including a porous inorganic pigment.

* * * * *